(12) United States Patent
Williamson et al.

(10) Patent No.: US 7,133,739 B2
(45) Date of Patent: *Nov. 7, 2006

(54) INTELLIGENT MICROWAVE OVEN

(75) Inventors: Charles G. Williamson, Columbia, MO (US); M. Lee Schrader, Hopedale, MA (US)

(73) Assignee: Salton, Inc., Lake Forest, IL (US)

(*) Notice: Subject to any disclaimer, the term of this patent is extended or adjusted under 35 U.S.C. 154(b) by 99 days.

This patent is subject to a terminal disclaimer.

(21) Appl. No.: 10/429,051

(22) Filed: May 2, 2003

(65) Prior Publication Data

US 2004/0058706 A1     Mar. 25, 2004

Related U.S. Application Data

(63) Continuation-in-part of application No. 10/001,260, filed on Nov. 1, 2001, and a continuation-in-part of application No. 10/000,784, filed on Nov. 1, 2001.

(51) Int. Cl.
*G06F 19/00* (2006.01)
*G05B 19/18* (2006.01)

(52) U.S. Cl. .................. 700/207; 700/90; 219/414; 99/325

(58) Field of Classification Search ................ 700/211, 700/209, 207, 90; 219/702, 714, 506, 414, 219/412; 99/325; 432/91; 126/19–22
See application file for complete search history.

(56) References Cited

U.S. PATENT DOCUMENTS

| 5,960,440 | A   | * | 9/1999 | Brenner et al. .......... 707/104.1 |
| 6,196,113 | B1  | * | 3/2001 | Yung ........................... 99/327 |
| 6,549,818 | B1  | * | 4/2003 | Ali ............................... 700/90 |
| 2003/0109938 | A1 | * | 6/2003 | Daum et al. .................. 700/11 |
| 2003/0141295 | A1 | * | 7/2003 | Ishikawa et al. ............ 219/697 |

FOREIGN PATENT DOCUMENTS

EP          1041860 A2  *  4/2000

\* cited by examiner

*Primary Examiner*—Kidest Bahta
(74) *Attorney, Agent, or Firm*—Sonnenschein Nath & Rosenthal LLP

(57) ABSTRACT

The invention may be broadly conceptualized as an approach in which a microwave oven receives a plurality of program recipes from a network that are executed by scanning with a scanner a symbol and associating the scanned symbol with one of the plurality of program recipes while keeping a real-time clock synchronized and correctly set by receiving period time synchronization messages.

17 Claims, 19 Drawing Sheets

| | | | |
|---|---|---|---|
| ADDRESS | http://www.radioconfig.com/alarms | | |

Clock ID —401

| DAY | ON TIME | ALARM TYPE |
|---|---|---|
| Sunday | [01] [00] [AM] | [PRESET 1] —418 |
| Monday | [07] [05] [AM] | [BUZZER] —420 |
| Tuesday | [07] [30] [AM] | [PRESET 1] |
| Wednesday | [07] [45] [AM] | [PRESET 2] |
| Thursday | [07] [55] [PM] | [BUZZER] |
| Friday  417 | [12] [00] [AM] | [91.5 FM] |
| Saturday | [09] [30] [AM] | [CD Track 3] |

Ultravection Oven - UPCs - Microsoft Internet Explorer

Please select ultravection programs from the list below.
You may set a maximum of 20 Ultravection programs.

Search Results

| Name | UPC | Selected |
|---|---|---|
| Old El Paso Nachos | 89713578 | ☑ |
| Oscar Mayer Wieners | 23454872 | ☑ |
| Betty Crocker Brownies | 56372623 | ☐ |
| Sara Lee Chicken Cacciatore | 76236477 | ☐ |
| Kraft Macaroni and Cheese | 59834267 | ☑ |
| Ore Ida Cajun French Fries | 26835733 | ☐ |
| Old El Paso Nachos | 89713578 | ☑ |
| Oscar Mayer Wieners | 23454872 | ☑ |
| Betty Crocker Brownies | 56372623 | ☐ |
| Sara Lee Chicken Cacciatore | 76236477 | ☐ |
| Old El Paso Nachos | 89713578 | ☑ |
| Oscar Mayer Wieners | 23454872 | ☑ |
| Betty Crocker Brownies | 56372623 | ☐ |
| Sara Lee Chicken Cacciatore | 76236477 | ☐ |
| Kraft Macaroni and Cheese | 59834267 | ☑ |
| Ore Ida Cajun French Fries | 26835733 | ☐ |

Fig. 8 beyond
appliances

Edit profile  log out  Program appliances  Contact us  Products  H

Select the News categories to display on your HomeHub. Enter up to 5 different keywords to use to filter the news in this category. When you have finished making your selections, click on the "Save Selections" button.

News | Sports

Available News Categories

☐ Business — 2204
Keywords: | Microsoft | Salton | sarvotham | | |

☐ Elections
Keywords: | asdf | | | | |

☐ Entertainment
Keywords: | dgg | | | | |

☐ General
Keywords: | | | | | |

☐ Health
Keywords: | | | | | |

☐ International
Keywords: | newnewnwenwe | news q | news | werwre | wewe |

☐ Politics
Keywords: | | | | | |

☐ Strange
Keywords: | | | | | |

☐ Technology
Keywords: | Powerline | 802.11g | | | |

☐ US
Keywords: | | | | | |

☐ Other
Keywords: | | | | | |

(Save Selections)

File:///G:/HomeHub/Virtusa/Html/Pages/ICEBOX/website/afterlogin.htm

INTELLIGENT MICROWAVE OVEN

CROSS REFERNCE TO RELATED APPLICATIONS

This application is a continuation-in-part of co-pending patent application Ser. No. 10/001,260 filed on Nov. 1, 2001 entitled "Remote Programming of Radio Preset Stations Over a Network" and co-pending patent application Ser. No. 10/000,784, filed on Nov. 1, 2001 entitled "Intelligent Microwave Oven Appliance."

BACKGROUND OF THE INVENTION

1. Technical Field

The invention relates to configuration of an appliance network. More particularly, the invention relates to an intelligent microwave oven that is able to communicate with and receive information from another device in a network.

2. Related Art

Current household appliances such as coffeemakers and ovens are independent and when used require manual programming. Some appliances, such as a coffeemaker, may be configured to have timers for turning the appliance on and off. The programming of the timers in these appliances is accomplished at the appliance using manual controls or buttons. Further, it is often impossible to change the configuration or programming of an appliance, such as the auto off timer in a coffeemaker, once the appliance has left the factory.

Another problem with household appliances is for every product cooked, such as a frozen dinner, the user must set the cooking temperature and the time. Dinners may be ruined or homes burned down because of a user erroneously setting the wrong cooking time or temperature. Prior approaches to resolving the erroneous setting problem have included cookbooks that contain bar coded instructions associated with encoded instructions for setting cooking time and temperature. Such appliances include a bar code reader to read the cookbook's bar code associated with a user-selected recipe. However, as new products are introduced in the supermarket or new recipes are created, the cookbooks must be physically updated or replaced.

Furthermore, it is not uncommon for appliances to have clocks that must be initially set and reset after a power outage. Due to the quality of the components in an appliance clock, it is rare when all clocks on respective appliances match and do not drift apart. After some period of time, the clocks on some of the appliances will have to be adjusted if a user desires all clocks to report the same time. Furthermore, clocks have to be reset twice a year in the United States for changes to or from Day Light Savings Time and may also have to be reset following a power outage.

Thus, there is a needed in the art for an approach to set cooking time and temperature that is easy to updated while enabling coordination of data between multiple appliances.

SUMMARY

An intelligent controller having a modem communicates with a remote database that has a plurality of user profiles. A user profile in the database is configurable via a device for displaying a user interface, such as a personal computer accessing the World Wide Web with web pages for an intelligent controller and other appliances. The intelligent controller receives user profile information via the modem from the database. The user profile may include, for example alarm clock settings, radio stations, and recipe programs for the appliances. A power line communication unit in the intelligent controller allows communication of data received by the modem via an external network to other appliances over a local network communication link, such as the alternating current (AC) wiring of a home, a wireless connection, or the in home telephone wires.

A clock is periodically synchronized to a time message that the web server transmits to the intelligent controller and distributed by the power line communication unit to appliances that are capable of receiving the power line communications. The synchronization automatically corrects for time changes and assures all clocks report the correct time. The user profile also contains a time zone identifier that enables the clocks, including the clock in the intelligent controller, to report the proper time for a specified time zone. The intelligent controller may also have an associated radio with radio preset radio stations being programmed in the user profile and received at the intelligent controller via the modem. The radio along with the clock may function as an alarm clock radio having an alarm associated with each day of the week and each alarm being independently settable to a "buzz" or any of the programmed radio stations.

A coffeemaker having a local network communication link may be one of the networked appliances. The coffeemaker may receive time, brew time, warming time, and turn on/off time configuration information from the intelligent controller. The coffeemaker may also communicate its status to the intelligent controller allowing a user to know at a remote location if the coffeemaker needs to be set up for brewing, coffee is brewing or ready. Similarly, a breadmaker having a local network communication link, a display and bar code reader may be one of the networked appliances. The breadmaker is able to receive bread making recipe programs from the intelligent controller for storage in local memory. A user upon scanning or otherwise inputting a unique product code, such as a universal product code (UPC), provided with a package such as a bread mix or cake mix configures the cycles of the bread machine. A cycle typically includes a mixing period, dough rising period, baking period, and warming period.

A microwave oven and a non-microwave type oven (for example, gas oven, electric oven, convection oven, or Ultravection™ oven) may be among the associated other appliances within the network. Each such oven would have a local network communication link and receiving recipe information from the remote database via the intelligent controller. The recipe information is stored in their respective memories. Each oven may also have a bar code reader for reading UPCs that results in the microwave oven or heating element type oven being configured for cooking the scanned product. The user may also be guided via a display screen through the preparation of the product.

If the input unique product code is unknown (i.e. not present in the memory of the appliance), the appliance may communicate the product code to the intelligent controller. The intelligent controller could then transmit the product code to the remote database as an unidentified product code. Later, a recipe program associated with the "unknown" product code may be transmitted back to the intelligent controller for further transmission to the original reporting appliance. The original reporting appliance then saves the recipe in memory.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The components in the figures are not necessarily to scale, emphasis instead being placed upon illustrating the principles of the invention. In the figures, like reference numerals designate corresponding parts throughout the different views.

FIG. 5 is a web page to set alarms and radio station via the device capable of displaying a user interface of FIG. 2.

FIG. 8 is a web page to select oven recipe programs via the device capable of displaying a user interface of FIG. 2.

FIG. 17 is an example web page to enter news keywords via the device capable of displaying the user interface of FIG. 2.

FIG. 18 is an example web page to enter events on a calendar via the device capable of displaying the user interface of FIG. 2.

DETAILED DESCRIPTION OF THE EXEMPLARY EMBODIMENTS

Figure 1:
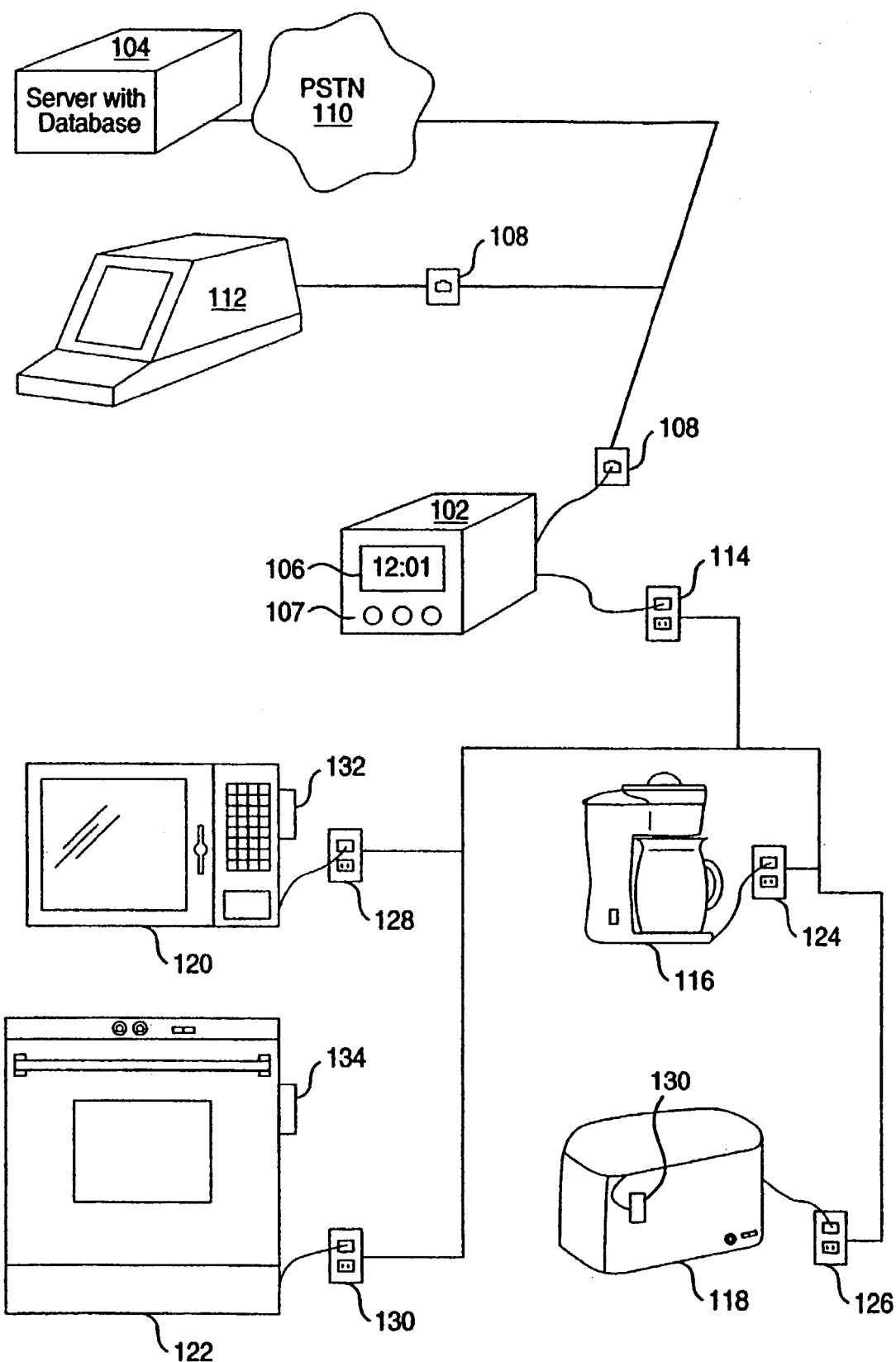
FIG. 1 is a diagram of an intelligent controller in communication with a device capable of displaying a user interface via a modem and other appliances via a local network communication link in accordance with an embodiment of the invention.

FIG. 1 shows an intelligent kitchen having an intelligent controller 102 in communication with a web server 104 via a modem (or via a broadband connection) and with electronic appliances by a power line communication protocol. In some alternative intelligent kitchen systems, the "appliance-controller connection" may be over CAT-3, CAT-5, or even fiber optical cables instead of via power line communications. In other alternatives, radio frequency (RF) transceivers may provide the local "wired" link between the intelligent controller 102 and appliances 116–122, this wireless link may conform to either a common wireless communication standard (e.g. WiFi or Bluetooth) or a proprietary one. In yet other potential embodiments, power line communication units provide a wired connection between the intelligent controller 102 and appliances 116–122 and RF transceivers provide a second or redundant path between the intelligent controller 102 and appliances 116–122. The intelligent controller 102 may have a display 106 and control surfaces 107, such as push buttons and knobs.

When the connection with web server 104 is via modem, the modem in the intelligent controller 102 is connected to a RJ-11 telephone jack 108. The intelligent controller 102 at periodic times uses the modem to initiate a data call through the PSTN 110 to a remote database 103. The remote database 103 contains data that is accessed by the server 104 and sent to the device capable displaying a user interface 112. An example of a remote database 103 is a database accessed by a web server upon a web page in a web browser either requesting or entering data. A device capable of displaying a user interface 112, such as a personal computer having another modem is also connected to via an RJ-11 telephone jack 108 and connected by PSTN 110 with server 104. The web device 112 communicates with the server 104 over an Internet Protocol connection. In an alternate embodiment, the intelligent controller 102 may connected through an internet service provider and may even use a cable modem or DSL router to connect with the Internet. In yet another embodiment, a different communication protocol may be used by the device 112 to communicate with server 104.

In a preferred embodiment, the intelligent controller 102 is also connected to the alternating current (AC) home wiring by a power line communication unit communicating through a cord that is plugged into an AC outlet 114. The power line communication unit is able to communicate with other similarly equipped appliances such as coffeemaker 116, breadmaker 118, microwave oven 120, and conventional type oven 122. Each appliance 116–122 has an associated power line communication unit that communicates through an AC outlet 124–130 for two-way communication between the intelligent controller 102 and the appliances 116–122. Examples of power line communication units include X-10, CEBus and POWERBUS power line communication units.

The power line communications between the intelligent controller 102 and the appliances 116–122 may be used to synchronize of all of the appliance clocks with the internal clock of the intelligent controller 102. In turn, the intelligent controller 102 may have an internal clock that is periodically synchronized by communication with the remote database 103 associated with the server 104. In one embodiment, the remote database 103 maintains accurate time by receiving a timing signal from an atomic clock. In an alternate embodiment, a GPS clock may provide an accurate time signal to the server 104. In another embodiment, a separate time server connected to an accurate clock or GPS clock may supply time to the network.

The coffeemaker 116 receives programming for when to turn on from over the power line via the intelligent controller 102. The coffeemaker 116 may periodically and/or randomly report its state to the intelligent controller 102, where it may be displayed. If an "on" time is set, for instance, then the coffeemaker 116 may report to the intelligent controller that it is not ready to brew. Once the user places water and coffee grounds in the coffeemaker 116, the user presses a button on the coffeemaker 116 to place the coffeemaker 116 in a "ready to brew" state. Alternatively, coffeemaker 116 may have sensors to determine whether supply water and coffee grounds are available. The coffeemaker 116 having informed the intelligent controller 102 that the coffeemaker is in the "ready to brew" state then may display a ready to brew symbol in the display 110. When the programmed time occurs, the coffeemaker 116 starts to brew the coffee and may notify the intelligent controller 102 that it is in the brewing state. The intelligent controller 102 may, in turn, display a brewing symbol on its (optional) display.

When the coffeemaker finishes brewing, it may notify the intelligent controller 102 that the coffee is ready. The intelligent controller 102 then may display, a "coffee is ready" symbol. The coffeemaker turns off automatically after a predetermined time period. It may also be turned off manually by a user pushing an off button. In either event, the coffeemaker may inform the intelligent controller 102 of the state change. The intelligent controller 102 may then report via its display that the coffeemaker is not ready to brew. Thus an advantage is achieved by having the intelligent controller 102 remotely display the state of the coffeemaker 116. Further, the time is correctly set and maintained by synchronization with the time maintained by the intelligent controller 102.

The breadmaker 118, microwave oven 120 and conventional oven 122 may each have a respective bar code reader 130–134. The bar code readers enables the user of appliances 118–122 to scan a unique product code, such as the universal product code (UPC) located on a food container. Alternatively, the appliances may be equipped with control surfaces, such as push buttons or switches, that allow a user to manually input the code. This may be used to make the appliances less expensive or where a bar code reader is broken or perhaps not purchased with the appliance. In another alternative, the breadmaker 118, microwave oven 120 and conventional oven 122 may each have a radio frequency identification (RFID) system.

Once a code is input, the appliances 118–122 then attempt to identify a recipe program associated with the input product code. If the recipe program is found in local memory, then the appliance is configured by the execution of the recipe program. Thus, an advantage is achieved by being able to configure the appliances 118–122 for different types and manufactures of consumer food products. Further the risk of incorrectly preparing the food products is reduced because of less human interaction during the cycle programming of the appliances 118–122.

Figure 2:
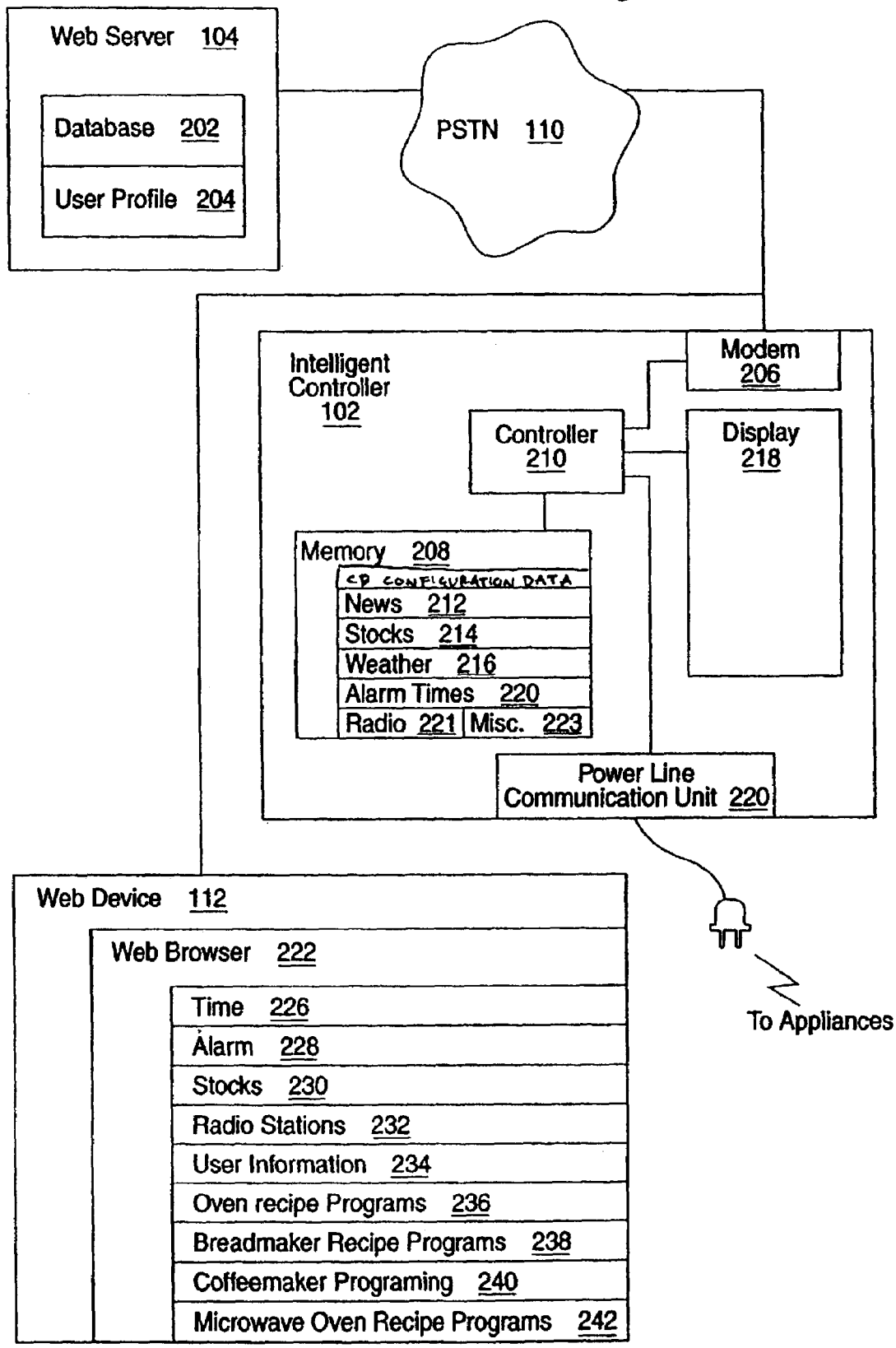
FIG. 2 is a diagram of the intelligent controller in communication with the web server and web device through a PSTN of FIG. 1.

Turning to FIG. 2, a diagram of the intelligent controller 102 in communication with the web server 104 and web device 112 through the PSTN 110 of FIG. 1 is shown. The web server 104 has a database 202 of user profiles with at least one user profile 204 associated with each intelligent controller. The user profile 204 is periodically pushed down to an associated intelligent controller 102 along with time synchronization data and updated user selected data, such as news 212, stock prices 214, weather reports 216 and calendar data 217. In an alternate embodiment, time synchronization data and updated user selected data may be pulled down by the intelligent controller 102 from the web server 104. The user selected data is sent from the web server 104 through the PSTN 110 to be received via modem 206 at the intelligent controller 102. The controller 210 stores the user-selected data (news 212, stock prices 214, weather reports 216 and calendar data 217) into memory 208. The user-selected data stored in memory 208 may then be displayed by the controller 210 on display 218 along with time information.

The user profile 204 stored in the database 202 located on the web server 104 also contains configuration data, such as time zone, user-selected preset radio stations, alarm times and settings ("buzz", radio station or CD player). The alarm times 220 and radio stations 221 and/or CD player configuration data is stored by controller 210 in memory 208 when periodically received by (whether by "push" or "pull") the intelligent controller 102 from the web server 104. Miscellaneous data, such as recipe program updates, new recipe programs, other text or programs may also be received by the intelligent controller 210 and stored in memory 208 or as appropriate miscellaneous memory 223. Data stored in memory 208 may also be transmitted to and received from other appliances through a local network communication link 220.

The user profile 204 is configurable via a web browser 222 being executed on the web device 112 connected by an Internet Protocol connection through PSTN 110 to web server 104. In particular, the web browser 222 accesses configuration web pages 224 that may be associated with the intelligent controller 102 and other appliances 116–122. A time web page 226 is presented to a user of the web device 112 that allows a user to enter the zip code where the intelligent controller 102 will be located in operation. In other embodiments the time web page 226, may be implemented as input fields on another web page, such as a user information web page 234. The zip code is then used by a program on the web server 104 to identify possible radio stations and time zones. In other embodiments, the user may select the time zone and city where the intelligent controller 102 is located. Further, the time web page 226 may be used to configure the clock function, set alarm web page 228. Other web pages that may be configured include stock selection web page 230, program radio stations web page 232, user information web page 234, web pages for selections of recipe programs for a oven 236, breadmaker recipe program selection web page 238, coffeemaker programming web page 240, recipe program selection web page for the microwave oven 242, recipe program selection pages for other appliances, family calendar web page 2300, and news feed web page 2200.

Each web page communicates with the web server 104 and may result in the user profile 204 in the database 202 being configured or updated. Changes in the user profile 204 are periodically transmitted between the intelligent controller 102 and the web server 104, preferably by pushing down the data (whole user profile or just the changes in the user profile), at predetermined intervals. Thus, the ability to change or update programs associated with the user profile is achieved by downloading the changes or updates to appliances 116–122 via the intelligent controller 102.

In an alternate embodiment, the web server 104 may contact the intelligent controller 102 and send the data contained in the user profile 204 to the intelligent controller 102 at periodic intervals. In yet another embodiment, the web server may contact the intelligent controller 102, upon configuration of the intelligent controller 102 and/or upon a change being made to the user profile 204. Similarly, in another alternate embodiment, the intelligent controller 102 may synchronize with the web server 104 and user profile 204 upon a predetermined action occurring. Examples of such actions include; a user physically pressing a button to cause synchronization, new appliances being detected on the power line, or receiving a "unknown unique product code" message from an appliance. Alternatively a continuous, broadband connection between the intelligent controller and the web server can be used. In this alternative, communications may be in real-time or periodically sent in bursts between the intelligent controller and the web server.

Intelligent Controller

Figure 3:
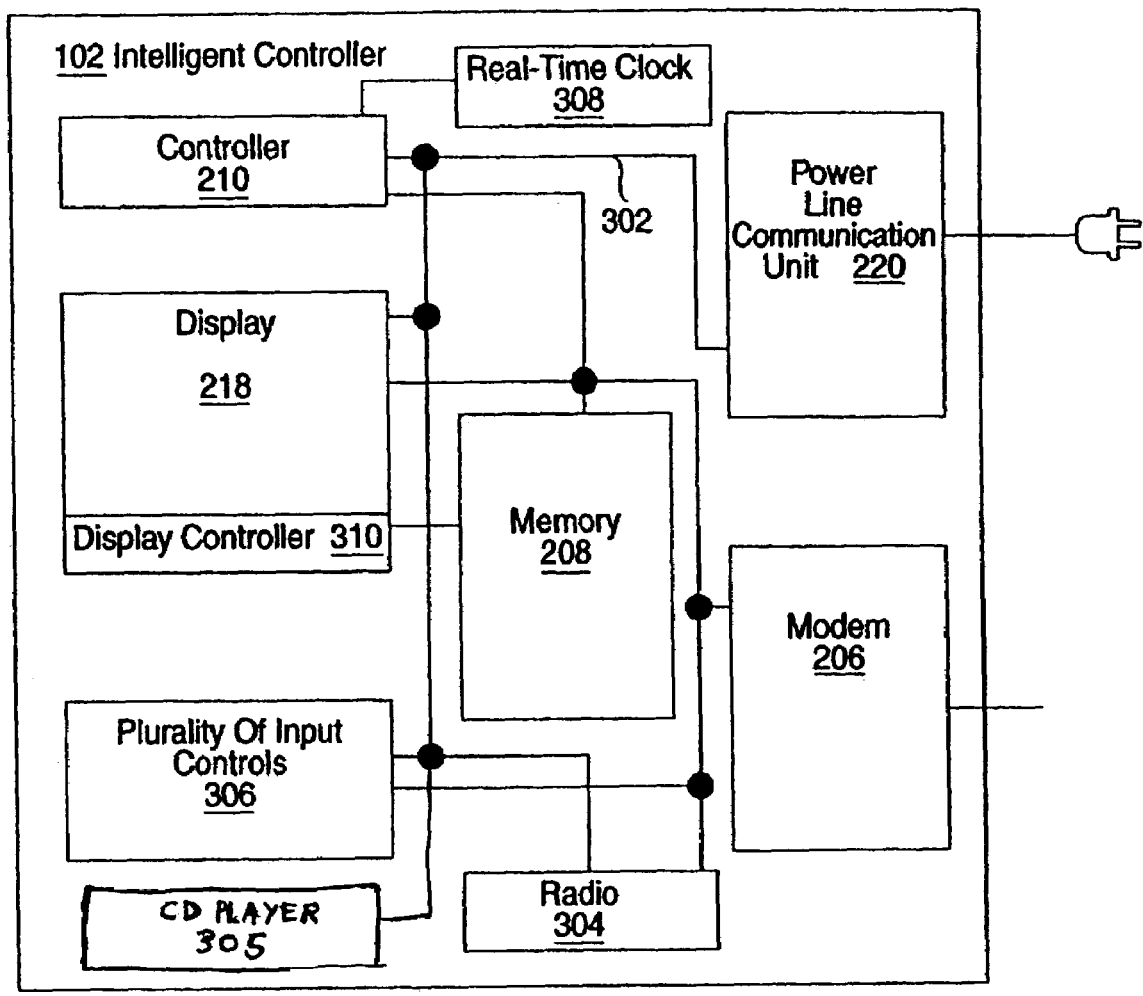
FIG. 3 is a block diagram of the intelligent controller of FIG. 2.

In FIG. 3, a block diagram of the intelligent controller 102 of FIG. 2 is shown. The intelligent controller 102 has a controller 210 that is connected by a bus 302 to the modem 206, the memory 208, and the local network communication link 220. The intelligent controller 102 may also include the display 218, a radio 304, CD player 305, a plurality of input controls 306, and a real-time clock 308. The controller 210 is preferably a microprocessor, but in an alternate embodiment may be a reduced instruction set chip (RISC) processor, micro-controller, digital circuits functioning as a controller, analog circuits functioning as a controller, a combination of analog and digital circuits functioning as a controller, or a digital signal processor.

The modem 206 is preferably a low speed 300–14,400 kbps internal modem and is a network interface to PSTN 110. Among other potential advantages, the use of a low speed modem keeps the cost of the system lower. In an alternate embodiment, a higher speed modem or network interface may be used. In yet another alternate embodiment, an external network interface may be used to access the PSTN 110 and connect to the intelligent controller 102 via an external bus such as a serial bus, SCSI bus, or universal serial bus (USB). The modem 206 may also make a connection to the external network by wireless means, such as wireless Ethernet connection, 900 MHz in home network, or cellular connection.

The radio 304 has a tuner 250 that is connected to amplifier 252, a plurality of input controls 306, an antenna 256, and a controller 210. The controller 210 is connected to tuner 250, network interface 260, memory 208, display 218 and clock 308. The clock supplies timing to the controller 210, the network interface 260 and the memory 208. The amplifier 252 is connected to the plurality of controls 306, the tuner 250 and at least one speaker 338 (stereo receivers often have two or more speakers).

Figure 3A:
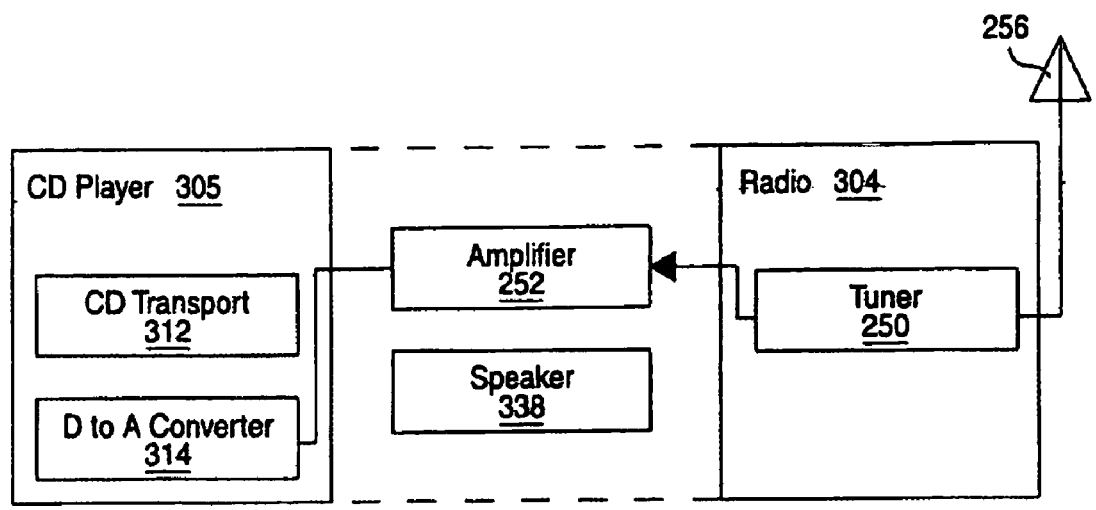
FIG. 3A is a block diagram of the radio and CD player portions of the intelligent controller of FIG. 2.

As shown in FIGS. 3 and 3A, the radio 304 is configurable by data received via the modem 206 by the controller 210. Such configuration information may include preset radio stations for among other available mediums both the AM and FM radio bands that are stored in memory 208. The radio 304 can be activated either by one of the plurality of input controls 306 or by the controller 210 in response to the real time clock 308. A radio signal is received by an antenna (not shown) among other available mediums such as streaming data. In an alternate embodiment, the radio 304 may included a weather alert radio in place of or in addition to the radio 304.

As shown in FIGS. 3 and 3A, the CD player 305 has a compact disk transport 312, a digital-to-analog converter 314 that is connected to amplifier 252, a plurality of controls 306, and a controller 210. The controller is connected to digital-to-analog converter 314, network interface 260, memory 208, display 218 and clock 308. Notably in a configuration having both radio and CD player, amplifier 252, plurality of controls 306, controller 210, display 218, clock 308, and speakers 338 may be shared as shown in FIGS. 3 and 3A. The CD player 305 is programmable by data received via the modem 206 via the controller 210. Such configuration information may include the first track to be played and/or a playlist of tracks to be played. Further information associated with the CD received in the CD player may also be received by controller 210 for display on the display 218 such as the album name, track titles, artist name and the like. This programming is accomplished via web device 112, web server 104 and user profile 204.

The display 218 is able to display text and low-resolution graphics. The display is controlled by a display controller 310 that is in communication with memory 208 and controller 210. Alternatively, display controller 310 may be integrated with controller 210 or display 218. The display 218 is a monochrome liquid crystal display (LCD). In an alternate embodiment, a high-resolution display may be used. Further, a color display may be used in yet another embodiment. In other embodiments, other types of displays that are capable of displaying data may be used, including for example cathode ray tubes and plasma displays. The display may even be a touch screen that combines the plurality of input controls 306 with display 218.

Among other data, the display 218 displays the current tuner setting, in other words the current radio station. In an alternate embodiment, the radio 304 is a clock radio and the display 218 displays the time and may display the date. In such an embodiment, the clock 308 may included a real-time clock for keeping track of time that is displayed by display 218.

A real-time clock 308 having a oscillator is connected to the controller 210. The real-time clock 308 is a digital chip that is programmable by the controller 210 in response to a synchronization signal (time message) being received at modem 206. The real-time clock 308 is preferably only accurate enough to maintain time for a period of approximately two weeks, thus allowing for greater variances in component quality. A network indicator may be provided on the display 218, to indicate if a synchronization of real-time clock 308 has occurred within a preceding two-week period. Thus, an advantage is achieved by maintaining the correct time by synchronization of the real-time clock 308 with the correct time maintained at the web server 104. Alternatively, a more accurate real time clock could be utilized, thus reducing the need for synchronization between the real-time clock 308 and the server 104.

The memory 208 is preferably a combination of random access memory (RAM), such as dynamic random access memory (DRAM), synchronous dynamic random access memory (SDRAM), or other types of read/write memory, and of read only memory (ROM), such as programmable read only memory (PROM), electrically erasable programmable read only memory (EEPROM). In an alternate embodiment, the memory may include external semi-permanent memory, such as magnetic disk (hard disk, removable hard disk, floppy disk), optical disk (CD-RW) or external permanent memory (CD-R and DVD-R). The memory 208 is divided into a program portion that controls the operation of the intelligent controller 102 and a data portion that maintains configuration data and variables used and manipulated by the controller 210 upon execution of a program.

The plurality of input controls 306 are used to manually tune the radio and adjust the volume. A plurality of preset buttons also comprise at least part of the plurality of input controls 306 that when set; will automatically tune the tuner 250 to a preset station. If the radio 304 is also a clock radio, then some of the plurality of input controls 306 will be for manually setting the time. In an alarm clock radio embodiment, additional controls in the plurality of controls 306 will be present to arm/disarm the alarm, set the alarm to buzz or radio, and set the alarm time.

The tuner 250 tunes the radio 304 to a frequency in a amplitude modulated (AM) frequency band or a frequency modulated (FM) frequency band. In alternate embodiments tuners capable of receiving fewer, other or additional frequency bands may be used in place of the AM/FM tuner 250. The controller 210 on display 218 displays the setting of the tuner 250. The tuner 250 receives the radio signal at antenna 256 and demodulates the signal into an audio signal. The audio signal is amplified by amplifier 252 and heard at speaker 338.

The radio 304 receives the configuration message from the server 104 at the network interface 260. The configuration message is then processed by the controller 210. The controller configures preset radio stations in the tuner 250 that are associated with the preset buttons in the plurality of controls 306. Upon configuration of the preset radio stations, a user is able to select one of the preset buttons in the plurality of controls and the tuner 250 tunes to that radio station. Thus, the user does not have to reset their preset radio stations after the radio 304 is de-energized by a power outage, batteries going dead, or the radio being unplugged.

Figure 3B:
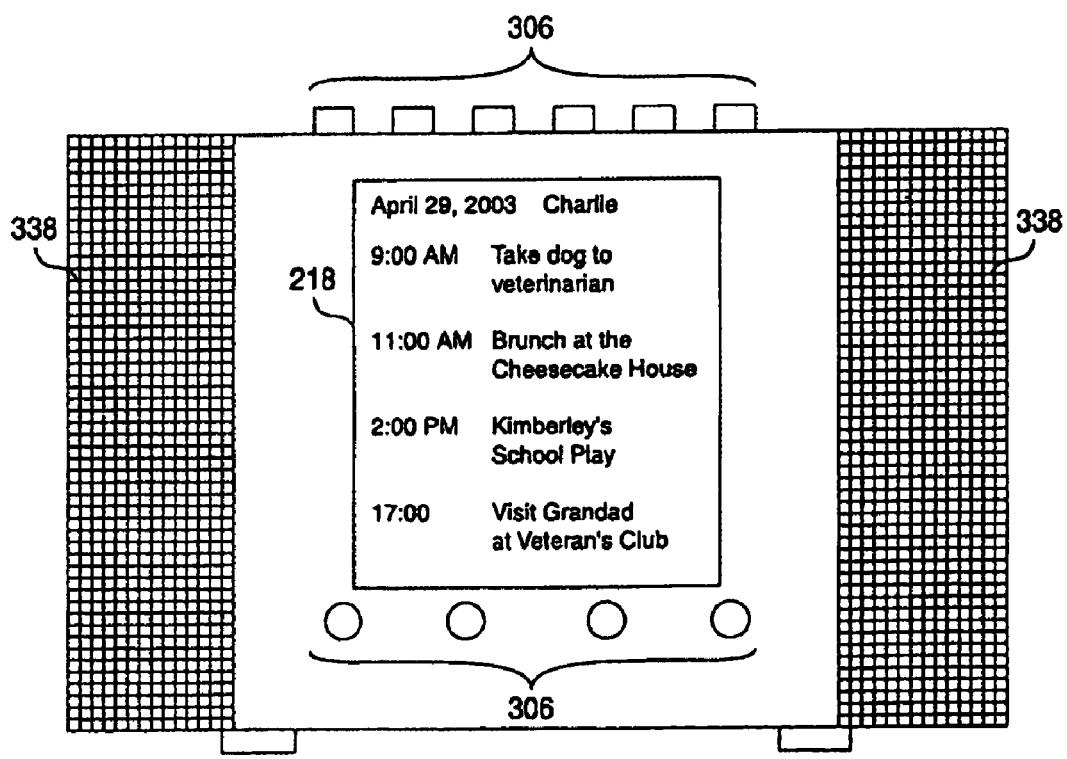
FIG. 3B is a depiction of the intelligent controller displaying a list of scheduled household events downloaded from a web server.

As shown in FIG. 3B, the intelligent controller may also be used to deliver reminders of scheduled household events. The user enters the hour and a description of these events in calendar 2302 on web page 2300. On the day of the event, the web server 104 downloads a list of events associated with each household member to the intelligent controller 102 for display on display 218 or any other display operably associated with intelligent controller 102. For instance, Charlie's schedule for Apr. 29, 2003 is depicted in FIG. 3B. The other household member's list of events could be toggled via the plurality of controls 306. Whereas the term "household" is commonly used to refer to a family setting, its meaning herein is broader and encompassing groups of individuals that live or work in the same location associated with the intelligent controller. For instance, a firm or company may be the household and its employees may be the household members. Likewise, a student dormitory may be the household and the students residing therein may be the household members.

The intelligent controller 102 may also deliver stock information of interest to the user. The user selects via web page 230 which stocks are to be monitored, e.g. the stocks of the user portfolio. The web server 104 then download stock updates to intelligent controller 102 for display on display 218 or any display device operably connected to the intelligent controller. Where the intelligent controller has a modem connection, these stock updates will likely reflect the prior day's close. Where the intelligent controller has a broadband connection, the updates may be in real-time or substantially in real-time. Where the intelligent controller has a modem connection, these news updates will likely reflect the prior day's latest news. Where the intelligent controller has a broadband connection, the news may be in real-time or substantially in real-time.

Likewise, the intelligent controller 102 may deliver real-time news from news agencies like Associated Press or Reuters. The user selects the news topics of interest on web page 2200. The web page then downloads the news pertaining to the topics of interest from the selected news agencies to the intelligent controller 102. The news may be displayed on display 218 or any display device operably connected to the intelligent controller 102.

The local network communication link 202 transmits a carrier signal that is capable of transporting data between the intelligent controller 102 and devices over a communication link. In a preferred embodiment, local network communication link 202 is a power line communication transceiver that sends and receives signals over a home's AC wiring that electrical appliances receive power. Thus, the power line communication unit is shown both a power supply for the intelligent controller 102 and a communication unit that enables two-way communication with other appliances that share the AC wiring, but may be implemented separately. Examples of such power line communication approaches include; X-10, CEBUS, and POWERBUS by Domosys Corp. In an alternate embodiment, the power line communication unit 202 may be replaced with a wireless RF unit that establishes a wireless connection between the intelligent controller 102 and other appliances. This wireless connection may also be implemented as a backup to a power line communication system.

The minimum functionality required in the intelligent controller 102 is to convert data received over an external network to the internal network enabling communication between the internal network and the external network. The communication path to the external network (e.g. Internet) is often costly to keep active and requires telephone resources that are only periodically available in a home. Therefore, the intelligent controller 102 acts as a temporary storage unit in the transmission of data. For example, if an appliance scans a product code that is unknown to that appliance, a message is sent to the intelligent controller 102 for future transmission to the web server 104 upon synchronization. Additional functionality is added to the intelligent controller 102 for the convenience of the user, such as the display 218, radio 304, CD player 305 and clock 308 with a human perceptible time indicator such as display 218, tones, synthesized voice, light emitting diodes forming a display.

Another slave intelligent controller (not shown) may be in communication with the intelligent controller 102 and act as a second input/display device. The slave intelligent controller has a controller, display, memory, power line communication unit, and plurality of control surfaces. In such a system, information displayed on the intelligent controller 102 is mirrored on the slave intelligent controller. The plurality of buttons 306 on intelligent controller 102 is also mirrored on the slave intelligent controller. Thus, a person may have one intelligent controller 102 and a plurality of slave intelligent controllers in different rooms of a home. Further, the slave intelligent controller may contain another radio and/or another CD player that is separately programmable from the radio and CD player in the master intelligent controller. Similarly, the slave intelligent controller may have an alarm clock that is separately programmable from the alarm clock in the master intelligent controller. In another embodiment, the intelligent controller 102 does not have a display 218 or plurality of button 306, rather the intelligent controller 102 relays the information to be displayed to all the displays on the slave intelligent controller and receives input from the plurality of button on the slave intelligent controllers.

Configuration Web Pages

A remote computer may function as the device capable of displaying a user interface 112. The remote computer is likely a general-purpose computer system such as an IBM compatible, Apple, or other equivalent computer (using a processor that may selectively be an Intel, AMD, Cyrix, Motorola 68XXX or PowerPC series, Compaq Digital Alpha, Sun, HP, IBM, Silicon Graphics, or other type of equivalent processor) that, among other functions, allow a user to communicate with server 104 via a external network, such as the PSTN network. The network is any network that allows multiple computer systems to communicate with each other such as a Local Area Network (LAN), Storage Area Network (SAN), Wide Area Network (WAN) alternative Intranet, Extranet, or the Internet. Server 104 is preferably a general-purpose computer system such as an IBM compatible, Apple, Unix type workstation, or equivalent computer (using a processor that may selectively be an Intel, AMD, Cyrix, Motorola 68XXX or PowerPC series, Compaq Digital Alpha, Sun, HP, IBM, Silicon Graphics, or other type of equivalent processor) that may generate a user interface, responds to commands, and communicates with server 104. Of course, the device 112 and server 104 need not be the same type of general-purpose computer. Both remote computer and server 104 preferably contain a network interface that allows for communication via a network. Network interfaces may selectively include hardware and any software capable of communicating with the network. Examples of the software would be any LAN, WAN, SAN, alternative Intranet, Ethernet capable or Internet compatible software program such as Novell, Windows, Unix, Netscape Navigator, Microsoft Internet Explorer, Mosaic, UP.BROWSER, or similar. It should also be noted that the network could comprise the public telephone network with server 104 acting as a dial-up bulletin board and remote computer dialing in directly to server 104 via the telco network.

Using a remote computer to operably connect to server 104—in a well-known manner dependent upon the technology of network—the user will access the home page of web pages, and thus access to the various functions of the server 104 would be made via hyperlinks. Of course, while the present disclosure is being made in a HTML-type environment, use of this environment is not required as part of the present invention. Other programming languages and user-interface approaches may also be used to facilitate data entry and execute the various computer programs that make up the present invention.

Information may be entered into the user interface for entry into a database 202 residing on the server 104. The information may be input in conjunction with a variety of computer data entry techniques. In some instances, the information may be type-checked (i.e. character, integer, date, etc.), limited by "lookup table" constraints or completely freeform. A user enters a user identifier and the serial number of the intelligent controller 102 into a web page. Upon actuation of the submit button (or similar action), the information entered in the different web pages populates the database entry (not shown) for each user. For new members this process may further involve the creation of a new database record. As a result, server 104 (or another general purpose computer or file server operably associated with server 104) stores the records in the database, the computer programming methods and procedures for which are well-known to those of ordinary skill in the art.

Figure 4:
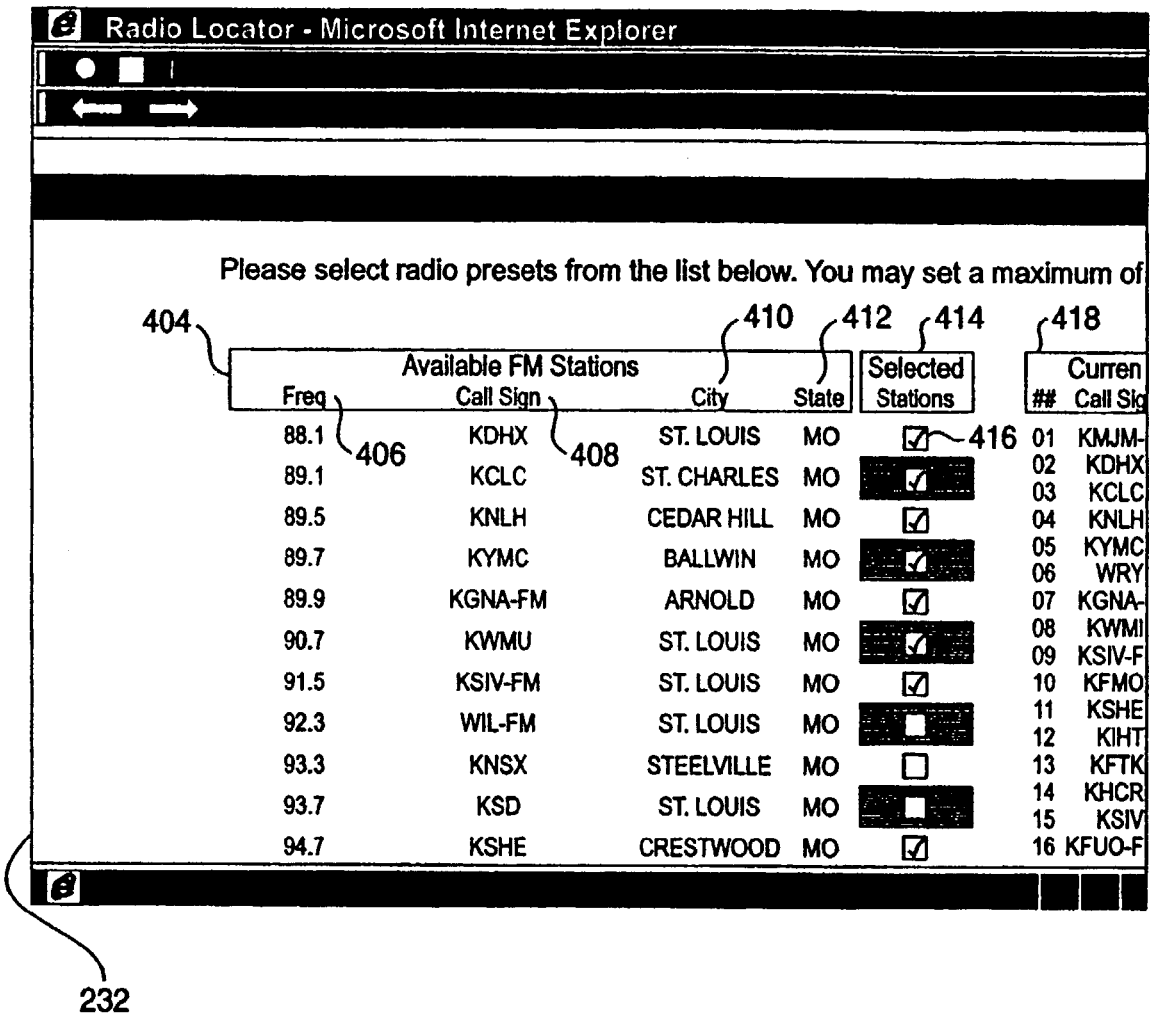
FIG. 4 is a web page to select preset radio stations for the intelligent controller via the device capable of displaying a user interface of FIG. 2.

In FIG. 4, an example web page to select radio stations 232 at the web device of FIG. 2 is shown. A user of the device capable of displaying a user interface 112 accesses the server 104 and a user profile associated with the intelligent controller 102. The user supplies information relating to the operating location of the intelligent controller 102 such as a zip code or enters time zone information in a time web page 226 and is then presented with other configuration web pages 224. The server 104 sends a web page 232 to the device 112 for selection of the preset radio stations. The location identifier is associated with a plurality of radio stations in proximity of the identified location. In a preferred embodiment, the zip codes 116 are stored in the database 202 with each zip code being associated with a plurality of radio stations 118. The user is then presented another web page in the graphical interface 110 that allows the radio stations to be assigned to the preset buttons of radio 304. The assignments of the radio stations to the preset buttons are then stored in the user profile 204.

In a preferred embodiment, the web page identifies the available radio stations 404 by their frequency 406, call sign 408, city 410, and state 412. In other embodiments, additional information such as radio station city, style of music or type of station (news or sports) may be displayed on the configuration web page 304. The user then selects 414 which of the stations should be pre-selected by placing a check in a box 416 associated with the desired station. The web page may also display the radio stations that have already been selected 418.

In this manner, the web page configures the preset radio stations is an association page that establishes an association list between a first set of configuration data and a second set of configuration data. The first set of configuration data is a plurality of preset button identifiers and the second set of configuration data is radio stations that may be assigned to the plurality of preset button identifiers. A check may be made as the user enters the preset radio button number to verify that a number has not been used twice and only the maximum number radio stations have been assigned preset radio button numbers. As would be understood by those familiar with graphical user interface design, the particular placement of elements and user input techniques could be modified in view of this present disclosure without departing from the scope of the invention. Upon completion, the web page is transmitted to the web server 104 for processing and placement of the data into the user's profile 204.

In another approach where the intelligent controller includes CD player 305, the user enters the International Standard Recording Code for a compact disk via web server 104. The list of track names and track numbers corresponding to said code may be retrieved from a database and displayed on the configuration web page. This database may be part of the server 104 or retrieved from one of the web-accessible public databases supplying compact disk data (e.g. www.gracenote.com/music/) The user is then able to use a playlist on the configuration web page to create a program to be used by the CD player 305 via controller 210.

Turning to FIG. 5, an example web page to set alarms and radio station at the web device 112 of FIG. 2 is shown. If radio 304 is an alarm clock, then a user may set the alarm times using the graphical interface 222 (web browser) and accessing an alarm configuration web page 402 by linking to the alarm configuration web page 402 from another page or by entering in the web address 404. The user may have to enter the clock ID 401 at the previous web page or a "cookie" may be present with a clock ID 401. The alarm configuration web page 402 is downloaded on a server 104 and displayed on web device 112 in the web browser 222.

In this preferred approach, the user is shown the day of week 502 and is presented an input field for selected "on time" 408. If the intelligent controller includes a radio, then the alarm may have a wake-up station 420 set to a default "buzz" (i.e. no station) or may be set to one of the radio station presets using a page similar to that of FIG. 4. Additionally, as shown in FIG. 5, where the intelligent controller includes a CD player 305, then the alarm may alternatively be set to activate the CD player and may further provide the ability to specify the track or the playlist to be played. Further, the user would then activate selected alarms by indicating in an input field (not shown) that the alarm is to be active. The user is able to review the current alarm settings by viewing the current alarm display 318 that is present on the web page 402. The changes that have just been made by a user may not be reflected in the current alarm display 508 until the alarm schedule is updated. Upon completion, the alarm schedule is updated and the data is transmitted to the web server 104 for processing and placement into the user profile 204.

The alarm configuration information is then sent from the server 104 to the radio 305 over network 102. The controller 210 associated with the radio 304 then sets the alarms in the clock 308. It is possible that in some embodiments, the alarms will be set in the controller 210. In an alternate embodiment, the server 104 also sends a time synchronization message to the radio that is a clock radio to set the clock 308

Figure 16:
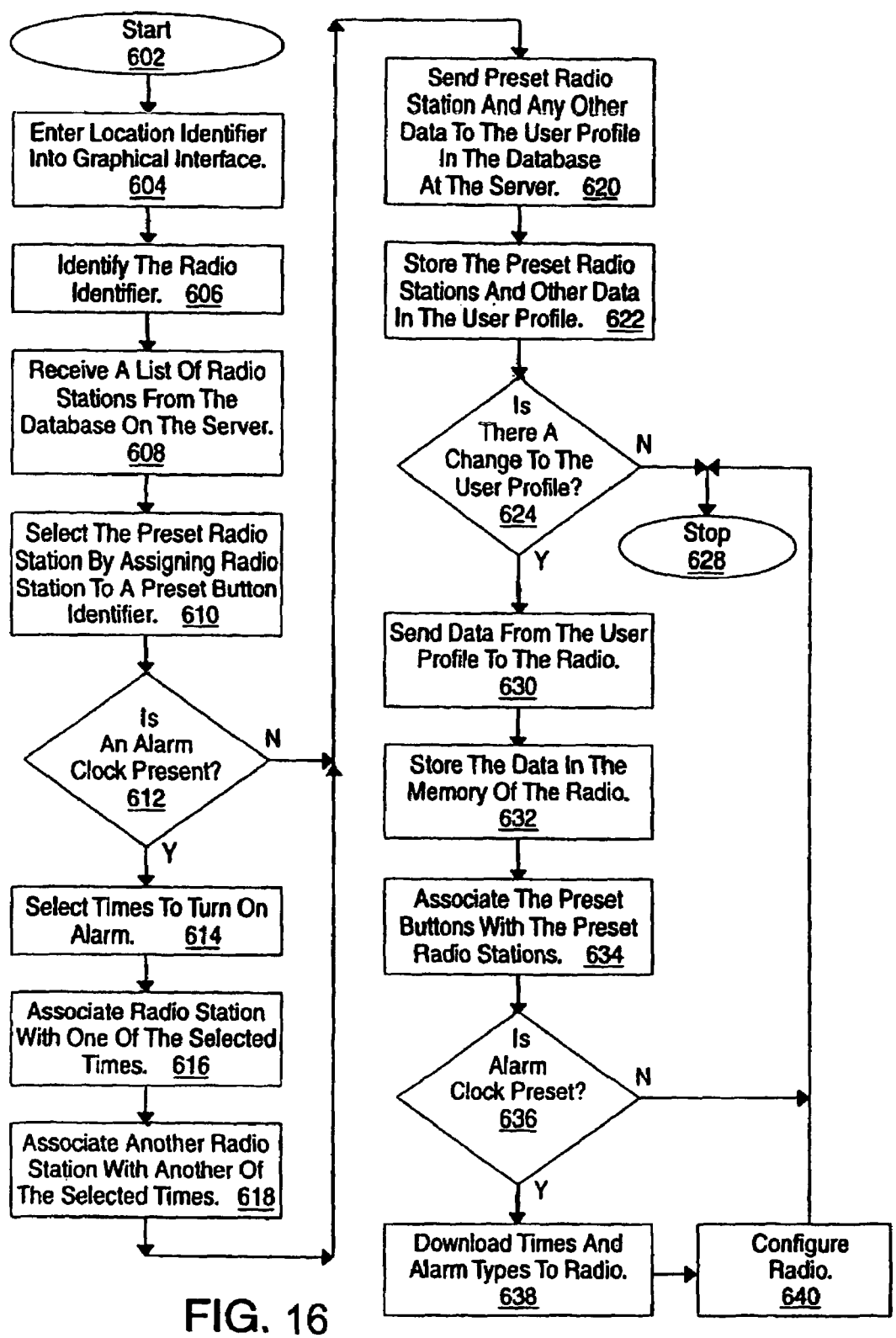
FIG. 16 is a flow chart of a process for remote programming of radio presets over a network in accordance with an embodiment of the invention.

In FIG. 16, a flow chart of a process for remote programming of radio presets over a network 102 is shown. The process starts (602) when the user displaying a web page enters a location identifier into the graphical interface (604). The user has also provided a user identifier via logging into the server or by a "cookie" having been placed during a previous session. In response to the location identifier, the server 104 access the database 202 and identifies the radio identifier in the user profile 204 (606) and the local radio stations contained in the radio station part of the database. The list of radio stations is sent from the server 104 to the web device 112 (608). As shown in FIG. 4, the user then selects the desired preset radio stations by assigning a preset button to each of the frequencies associated with the desired preset radio station (610). If a clock for displaying is not preset (612), then the preset radio stations and any other user profile data from the web page is sent to the server 104 (620) for storage in the user profile 204 of the database (622).

If a clock for displaying time is present (612), i.e. radio 304 is a clock radio, then the alarm web page 402 is displayed and the user selects the alarm times (614). The selected alarm times are then associated with a radio frequency or left blank for a "buzz" alarm (616). Another alarm is then selected and associated with another radio frequency or left blank again for the "buzz" alarm (618). The alarm configuration information is then sent in addition to the preset radio stations from the web device 112 to the server 104 (620) where the data is stored in the user profile 204 in the database 202 (622). If the user profile in user profile is accessed by a web device 104 (624) and no change occurs, then processing is complete (628). If the user profile 204 has changed (624), then the data from the user profile 112 is sent to the radio 304 (630).

Upon receipt of the data from the user profile, the preset radio stations and the association with the preset buttons in the plurality of controls 306 stored in the memory 208 of the intelligent controller associated with the radio. Each of the preset buttons is associated by the controller 210 with a radio station as contained in the received association that was saved in memory 208 (634). When preset button is selected, the tuner will tune to the associated radio frequency that was contained in the association.

If the radio is not associated with a clock (636), then processing is complete (628) and the radio is configured. If the radio does contain a clock (636), then the alarm time and alarm settings (radio or "buzz") contained in the user profile 204 are sent from the server 104 to the intelligent controller (638). The controller 210 receives the alarm time and the alarm settings and sets the alarm time and alarm settings (640). The configuration processing is then complete (628).

Figure 6:
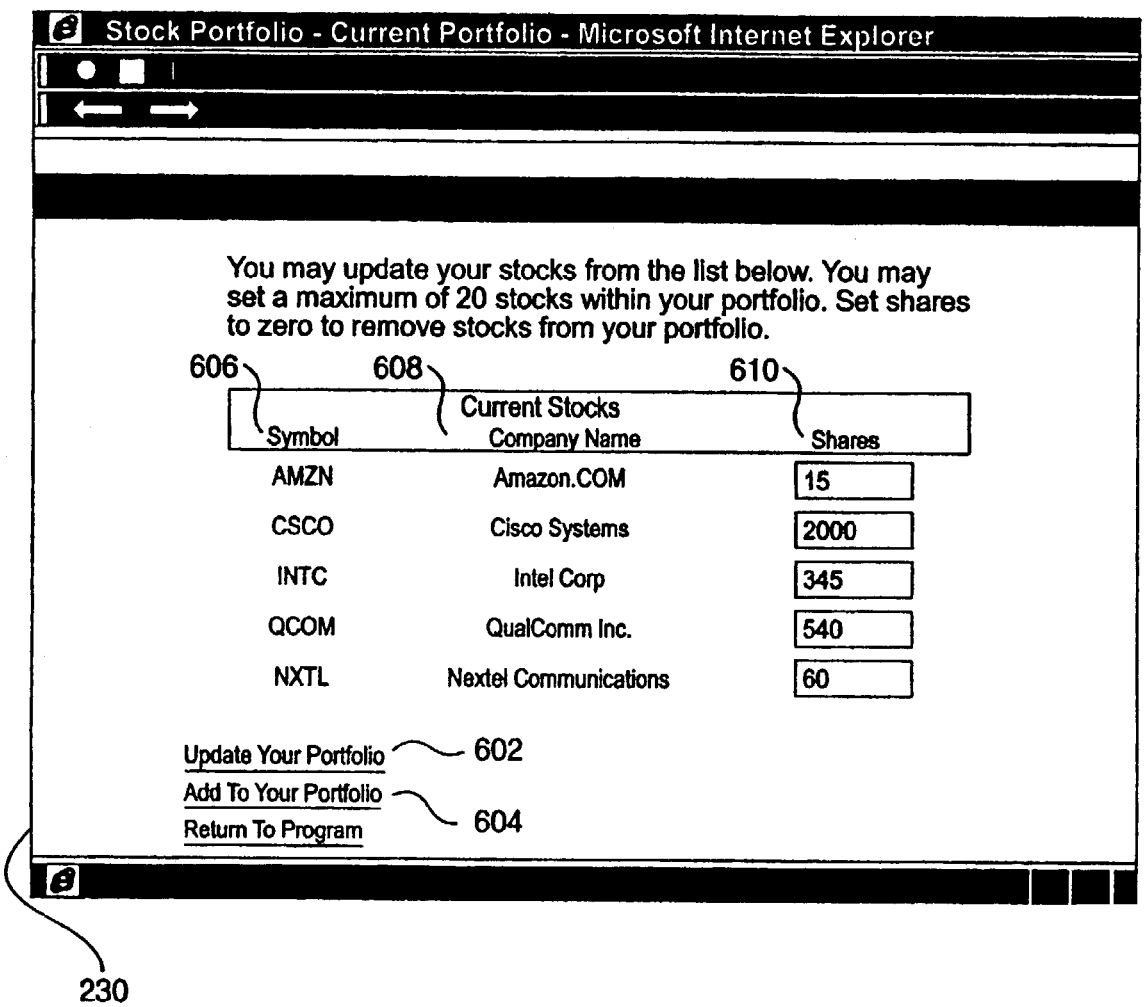
FIG. 6 is a web page to enter current stocks via the device capable of displaying a user interface of FIG. 2.

In FIG. 6, an example web page 230 to enter current stocks at the web device 112 of FIG. 2 is shown. A user may select the web page 230 to select stocks for inclusion in a portfolio tracker. The user is then presented with his current portfolio (initially empty) that includes stock symbols 606, company names 608 and the number of shares 610. The user is also presented with the options of selecting other web pages such as "Update Your Portfolio" 602 or "Add to Your Portfolio" 604. "Updating Your Portfolio" 602 enables a user to access a web page with input boxes for the number of shares. "Add to Your Portfolio" 604 accesses a web page for adding or deleting stocks from the portfolio. Upon completion, the data from web page 230 is transmitted to the web server 104 for processing and placement into the users profile 204. In addition, the web server may be programmed to download selected data from the user's portfolio tracker (e.g. the share price of a stock owned by the user) to the intelligent controller 102 for display on display 218 or another display device operably connected with the intelligent controller 102. This download may be carried out on a real-time basis, especially if the household is provided with broadband connection, thus rapidly appraising the user on the status of stocks of interest.

In FIG. 17, an example web page 2200 to enter news keywords at the web device 112 of FIG. 2 is shown. The user is presented with buttons 2202 for the inclusion of news categories of interest. The user then inputs keywords defining specific sub-categories in boxes 2204. Upon completion, the data from web page 2200 is transmitted to the web server 104 for processing and placement into the user profile 204. News feeds pertaining to the categories chosen by the user are automatically downloaded from web server 104 to the intelligent controller 102 for display on display 218 or another display device operably associated with the intelligent controller. This feature is particularly attractive if the household is provided with a broadband connection allowing for real-time news feeds. Associated Press or Reuters are non-limiting examples of news sources providing the news feeds.

Figure 7:
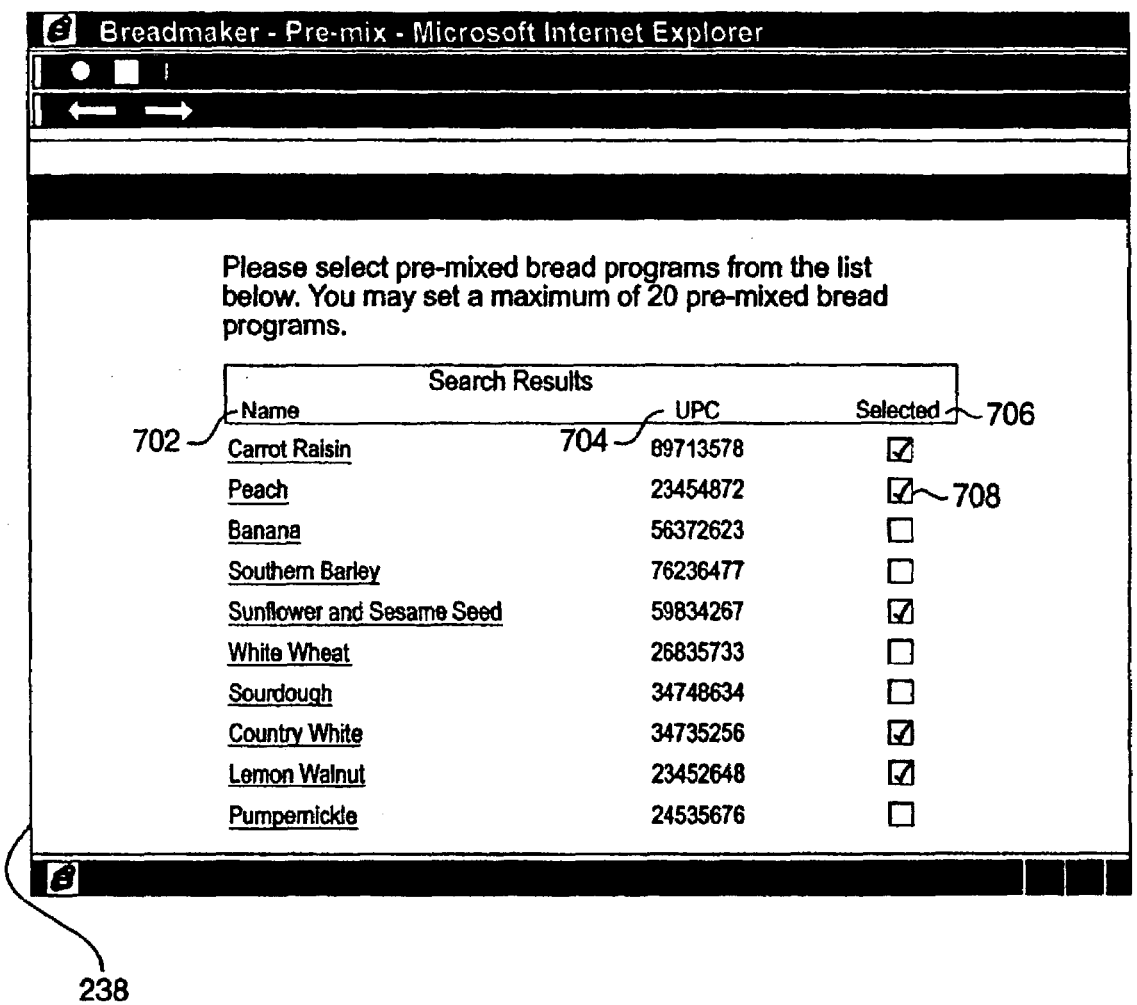
FIG. 7 is a web page to select pre-mix breadmaker recipe programs via the device capable of displaying a user interface of FIG. 2.
Figure 18:
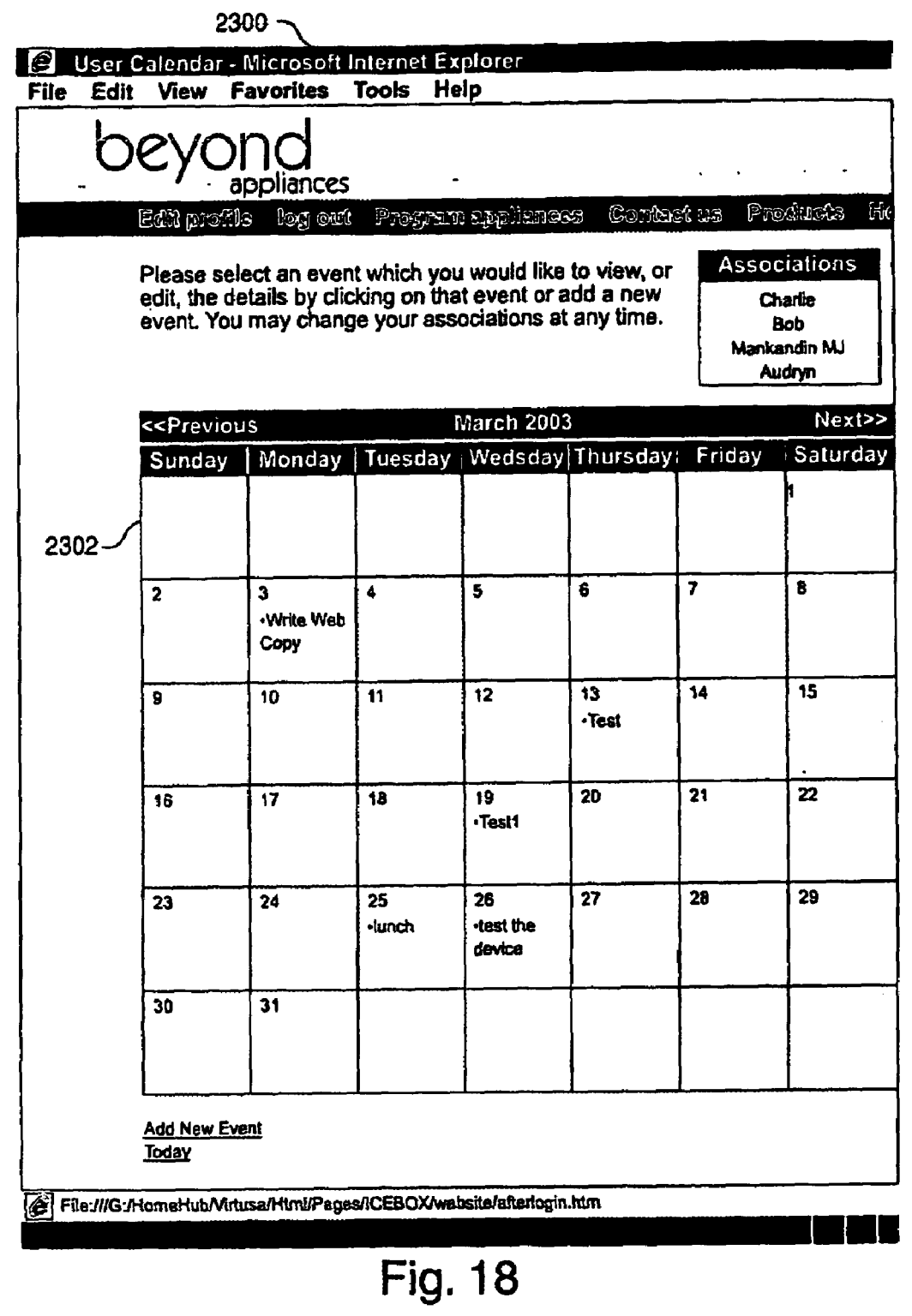

In FIG. 18, an example web page 2300 to schedule household events at the web device 112 of FIG. 2 is shown. The user is presented with web site 2300 for inputting the day, time, and description of one or more events in monthly calendar 2202. In one embodiment the user may be provided with the ability to attribute an event to one of a plurality of household members. Upon completion, the data from web page 2300 is transmitted to the web server 104 for processing and placement into the users profile 204. On the day of the event, a list of events is downloaded for each household member to intelligent controller 102 for display on display 218 or another display device operably associated with the intelligent controller Turning to FIG. 7 an example web page 238 to select pre-mix breadmaker recipe programs at the device 112 of FIG. 2 is shown. The page may be made inaccessible to users who have not purchased an intelligent breadmaker 118. A user accesses the web page 238 from the web server 104 and selects the pre-mixed bread recipe programs that user desires to have downloaded to the breadmaker 118. Of course, it should be understood that the recipe programs shown are by way of example and not intended to limit the invention. The name of the pre-mixed bread 702 is displayed along with an associated unique product codes, such as UPC 704. The user selects a pre-mixed bread recipe program 706 by placing a mark in an input box 708. The memory limitation of the breadmaker is reflected by the number of pre-mix bread recipe programs that may be selected and ultimately downloaded, twenty in the present example. In an alternate embodiment, more recipes may be downloaded if more memory is available or if compression techniques are used. In yet other embodiments, the selection of recipe programs occurs over time automatically with a predetermined number of the most recent used recipe programs being selected. The current selected pre-mix bread recipe programs will be displayed on web page 238 with checks in the selection input field 706. Upon completion, the web page 238 is transmitted to the web server 104 for processing and placement of the data into the user's user profile 204.

In FIG. 8, an example web page 236 to select oven recipe programs at the web device 112 of FIG. 2 is shown. The page may be made inaccessible to users who have not purchased an intelligent oven. A user accesses the web page 236 from the web server 104 and selects the oven recipe programs that the user desires to have downloaded to the oven. The names of the oven recipe programs 802 are displayed along with an associated UPC 804. The user selects a oven recipe program 806 by placing a mark in an input box 808. The memory limitation of the oven is reflected by the number of oven recipe programs that may be selected and downloaded, 20 recipe programs in the present example. In an alternate embodiment, more recipe programs may be downloaded if more memory is available or if compression techniques are used. In yet other embodiments, the selection of recipe programs occurs over time with a predetermined number of the most recent recipe programs being selected. The current selected oven recipe programs will be displayed on the web page 236 with checks in the selection input field 806. Upon completion, the data from web page 236 is transmitted to the web server 104 for processing and placement into the users profile 204.

Figure 9:
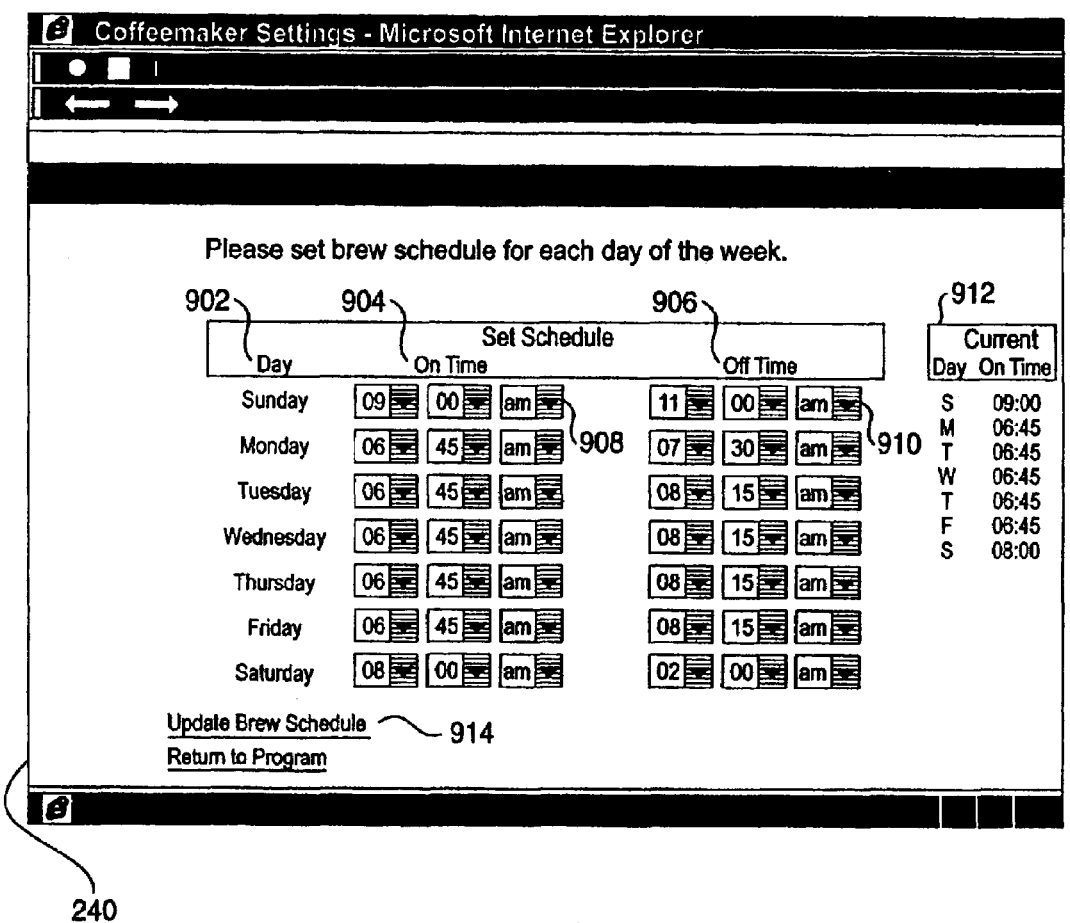
FIG. 9 is a web page to configure the coffeemaker settings via the device capable of displaying a user interface of FIG. 2.

Turning to FIG. 9, an example web page 240 to configure the coffeemaker settings at the web device 112 of FIG. 2 is shown. The page may be made inaccessible to users who have not purchased an intelligent coffeemaker. Upon accessing the web page 240 to configure the coffeemaker settings, the user is presented with a schedule for each day of the week 902. The user is shown the current "On Time" 904 and "Off Time" 906. The user is able to change the "On Time" 904 or "Off Time" 906 by accessing the appropriate input box 908 and 910 for example. The user is also shown the current brew schedule 912 for the coffeemaker. The brew schedule is updated by selection "Update Brew Schedule" 914 and the data is updated in the user profile 204 located in the database 202 located at the web server 104. Although the example of FIG. 9 shows only one setting per day of the week, it is contemplated that any or all days could have a plurality of "On Times" and "Off Times".

Figure 10:
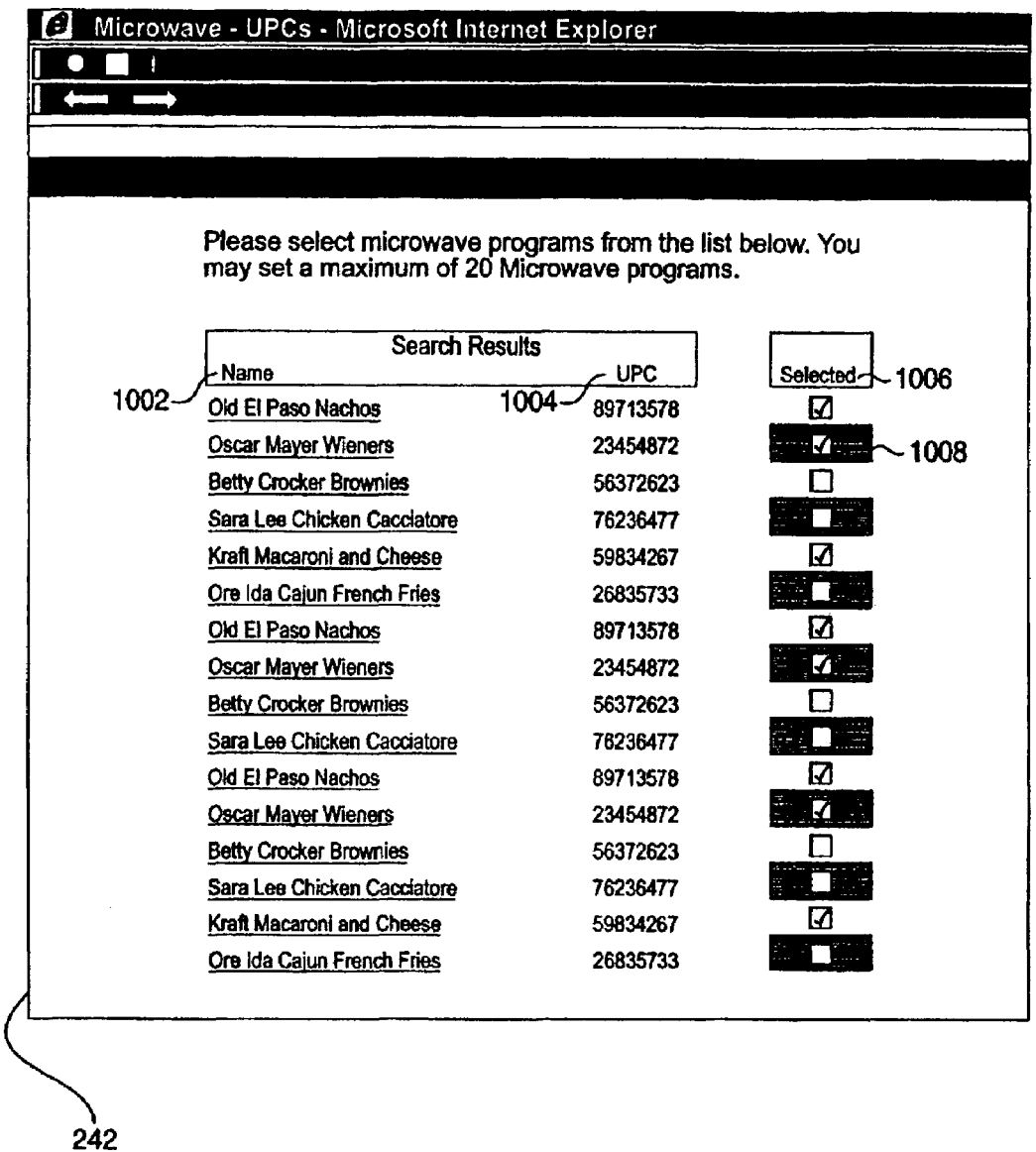
FIG. 10 is a web page to select microwave recipe programs via the device capable of displaying a user interface of FIG. 2.

In FIG. 10, an example web page 242 to select microwave recipe programs at the web device 112 of FIG. 2 is shown. The page may be made inaccessible to users who have not purchased an intelligent microwave oven. A user accesses the web page 242 from the web server 104 and selects the microwave oven recipe programs to be downloaded to the oven. The name of the microwave oven recipe program 1002 is displayed along with an associated with a unique product code, such as UPC 1004. The user selects a microwave oven recipe program 1006 by placing a mark in an input box 1008. The memory limitation of the microwave oven is reflected by the number of microwave oven recipe programs that may be selected and downloaded, twenty in the present example. In an alternate embodiment, more recipe programs may be downloaded if more memory is available or if compression techniques are used. In yet other embodiments, the selection of recipes occurs over time with a predetermined number of the most recent used recipe programs being selected. The current selected oven recipe programs will be displayed on the web page 236 with checks in the selection input field 1006. Upon completion, the data from web page 242 is transmitted to the web server 104 for processing and placement into the users profile 204.

Coffeemaker

Figure 11:
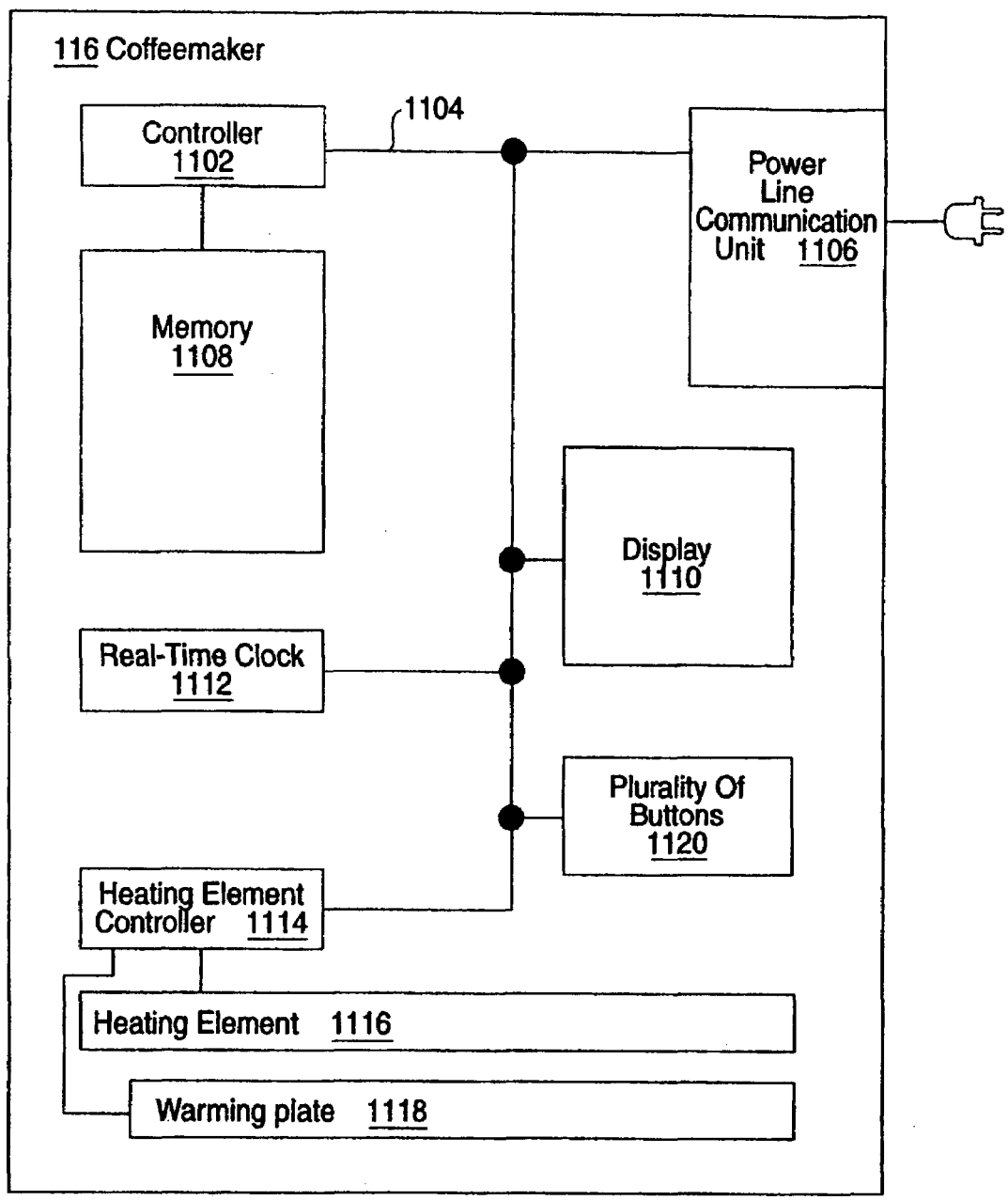
FIG. 11 is a block diagram of the coffeemaker with a local network communication unit of FIG. 1.

FIG. 11 is a block diagram of the coffeemaker 116 (also shown in FIG. 1) with a local network communication link 1106 of FIG. 1. In the preferred embodiment, 1106 is a power line communication unit. The coffeemaker 116 includes a controller 1102 that is operably connected to a bus 1104 that enables communication with a local network communication unit 1106, memory 1108, display 1110, a real-time clock 1112, and a heating element controller 1114. The heating element controller 1114 is able to electrically control the heating element 1116 and warming plate 1118. A plurality of buttons 1120, may also be present and in communication with the controller 1102 to enable manual configuration/operation of the coffeemaker 116.

The controller 1102 is a preferably a microprocessor. In an alternate embodiment controller 1102 may be a reduced instruction set chip (RISC) processor, micro-controller, digital circuits functioning as a controller, analog circuits functioning as a controller, a combination of analog and digital circuits functioning as a controller, or a digital signal processor.

The display 1110 is a light emitting diode display and is able to display numbers (time) and human perceptible indicators such as graphics, text, light emitting diodes, light bulbs, audio signal, or even mechanical signal (i.e. flags or arms that are raised and lowered). The indicators indicate among other possibilities when the coffeemaker 116 is on, programmed, ready to brew, brewing, and coffee ready. In an alternate embodiment, the display 1110 may be a liquid crystal non-color display. In yet another alternate embodiment, a high-resolution display may be used. Further, a color display may be used in yet another embodiment. The display may even be a touch screen display that combines the plurality of buttons 1120 with display 1110 in an additional embodiment.

The local network communication unit 1106 is a unit that transmits a carrier signal that is capable of transporting data between devices over the traditional home AC wiring that electrical appliances receive power from. Thus, the local network communication unit 1106 is shown as both a power supply for the coffeemaker 116 and a communication unit that enables two-way communication with the intelligent controller 102 that share the AC wiring. Examples of such power line communication approaches include; X-10, CEBUS, and POWERBUS by Domosys Corp. Of course, other local network interfaces could alternatively be substituted, such as wireless, cellular and telephone line network interface.

The memory 1108 is preferably a combination of random access memory (RAM), such as dynamic random access memory (DRAMs), synchronous dynamic random access memory (SDRAMs), or other types of read/write memory, and of read only memory (ROM), such as programmable read only memory (PROM), electrically erasable programmable read only memory (EEPROM). In an alternate embodiment, the memory may include external semi-permanent memory, such as magnetic disk (hard disk, removable hard disk, floppy disk), optical disk (CD-RW) or external permanent memory (CD-R and DVD-R). The memory is 1108 is divided into a program portion that controls the operation of the coffeemaker 116 and a data portion that maintains configuration data and variables used and manipulated by the controller 1102 upon execution of a program.

In manual operation, the user may set the real-time clock 1112 of the coffeemaker via the plurality of buttons 1120. The coffeemaker may be turned on or off by one of the plurality of buttons 1120. Once turned on, controller 1102 in the coffeemaker 116 will instruct the heating element controller 1114 to automatically turn off the heating elements after a short period of time (after coffee is made). After two hours, the controller 1102 will automatically instruct the heating element controller 1114 to turn off the warming plate 1118. The controller 1102 is aware of elapsed time by setting timers in the real-time clock 1112.

The coffeemaker 116 may also alternatively be configured from the intelligent controller 102 and web device 104. The intelligent controller 102 detects the presence of coffeemaker 116 when the coffeemaker 116 broadcasts a message via the local network communication unit 1106 upon the coffeemaker 116 being energized (plugged-in to the outlet 124). In an alternate embodiment, the intelligent controller 102 periodically checks for new appliances, by broadcasting a message to all appliances connected either to the power line network or by periodically searching for specific types of appliances, such as coffeemaker 116. In yet another embodiment, registration occurs at a web page displayed on the web device 104 that enables the user to enter information into a user profile 204, such as selecting an input box associated with the coffeemaker or a serial number, that is downloaded to the intelligent controller 102.

In one potential embodiment, the controller 1102 communicating with the intelligent controller 102 via local network communication unit 1106, results in an indicator appearing in the display 1110 to show network communication has been established. The indicator may occur after a time message has been received by the controller 1102 and real-time clock 1112 has been set. The indicator will stay lit for a predetermined indicator time even if communication with the intelligent controller 102 is lost. After that predetermined indicator time, the "network link established" indicator will be deactivated and no longer visible on the display 1110. In an alternate embodiment, the indicator will be deactivated upon the controller 1102 losing communication via the local network communication unit 1106 with the intelligent controller.

The controller 1102 in the coffeemaker 116 may periodically receive time messages from the intelligent controller 102 over the local communication network that results in the controller 1102 setting the real-time clock 1112. In an alternate embodiment, the controller 1102 receives a specific time message that is transmitted only to the coffeemaker 116. In yet another embodiment, the controller 1102 requests a time message from the intelligent controller via the local network communication unit 1106 when power is initially applied to the coffeemaker 116 or restored after a power outage.

The controller 1102 receives programming information from the intelligent controller 102 via the local network communication unit 1106. The intelligent controller in turn has obtained the information from the user profile data entered on the coffeemaker web page 240. The programming of the coffeemaker 116 is by day of week, but in an alternate embodiment may be configurable for multiple time events (multiple times a day, just not once a day). When the coffeemaker 116 is programmed to turn on, the controller 1102 preferably stores the information in memory and sets an event to trigger in the real-time clock 1112. Because this is local to the coffeemaker, once set even if network connection is lost, the coffeemaker 116 can go on. The display 1110 activates a timer indicator to show the coffeemaker 116 has been programmed. At each programmed day and time, the controller 1102 is notified of the event by real-time clock 1112 and notifies the heating element controller 1114 to turn on the heating element 1116 and warming plate 1118. After a preset time, the heating element controller 1114 turns off the heating element 1116 and the coffee is kept hot by the warming plate 1118. During the coffee making operation, the controller 1102 activates an "on" indicator in display 1110. When the heating element controller 1114 turns off the heating element 1116, the controller activates a "ready" display on display 1110.

Preferably, the controller 1102 sends messages via the local network communication unit 1106 to the intelligent controller 102 when the state of the coffeemaker 116 changes. When the coffeemaker 116 is programmed with times for turning on, the controller 1102 may send a message indicating that the coffeemaker is not ready to brew to the intelligent controller 102. A user prepares the coffeemaker 116 by placing water and coffee grounds in the coffeemaker 116 and by pressing one of the plurality of buttons 1120 to activate the coffeemaker 116. The controller 1102 may send a message to the intelligent controller that the coffeemaker 116 has been activated. When the programmed time occurs, the coffeemaker 116 is turned on and the coffee starts to brew. The controller 1102 then sends a message to the intelligent controller 102 signifying that the coffee is brewing. When brewing is complete, the controller 1102 notifies the intelligent controller 102 by sending a message via the local network communication unit 1106.

After the predetermined hold time (generally two hours) about two hours, the heating element controller 1114 is notified over bus 1104 by the controller 1102 to turn off (auto off) the warming plate 1118. The controller 1102 also deactivates the "on" indicator and the "ready" indicator in display 1110. The controller 1102 also send a message to the intelligent controller 102 to inform the intelligent controller 102 that the coffeemaker 116 is again in the not ready to brew. In an alternate embodiment, the period of time for auto off may be set at a web page and stored in the user profile 204 for downloading to the coffeemaker 116 via the intelligent controller 102.

Breadmaker

Figure 12:
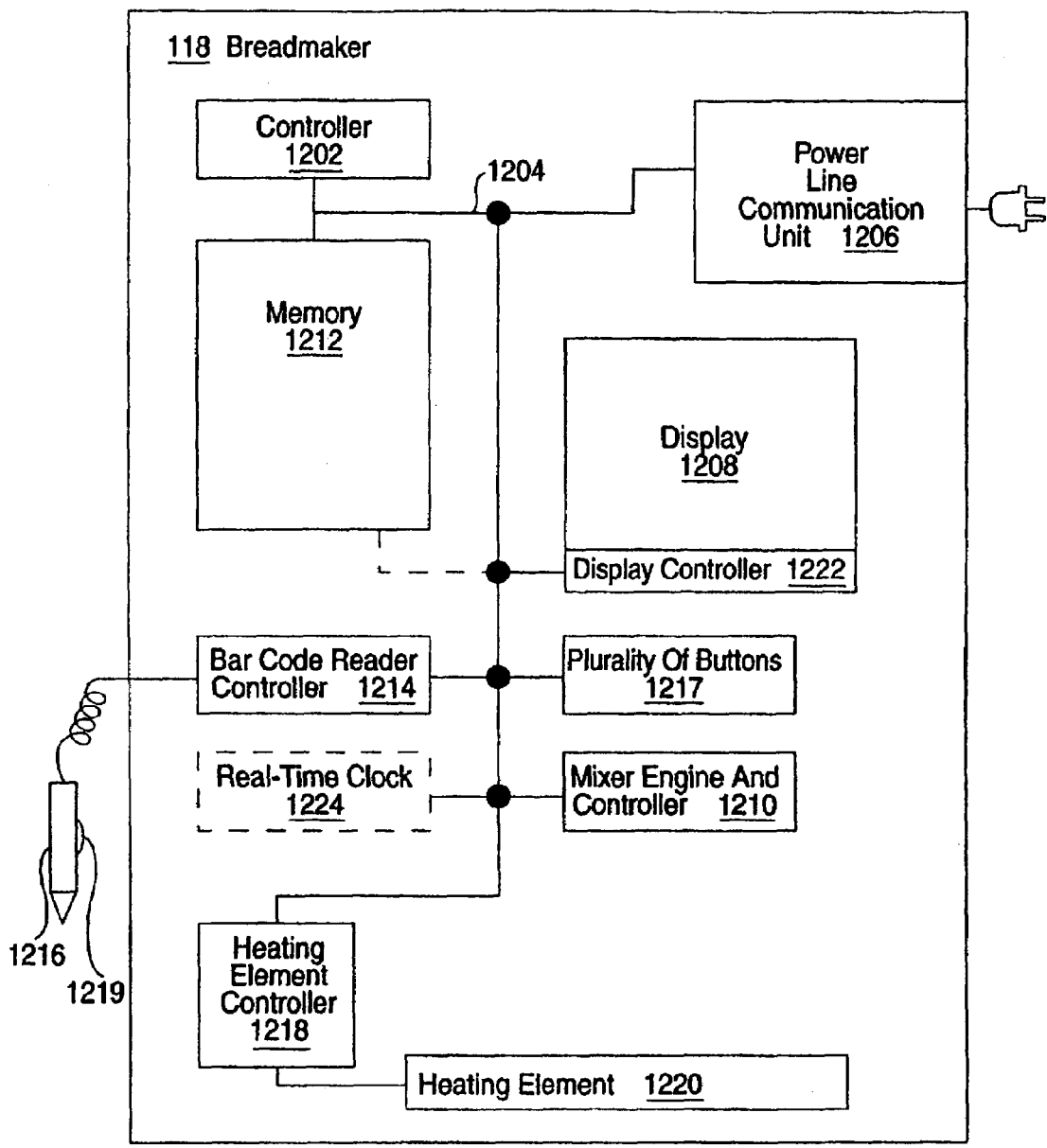
FIG. 12 is a block diagram of the breadmaker with a local network communication link of FIG. 1.

Examining FIG. 12, a block diagram of the breadmaker 118 with a local network communication link 1206 of FIG. 1 is shown. Local network communication unit 1206 is preferably a power line communication unit. A controller 1202 is operably connected by a bus 204 with the power line communication unit 1206, display 1208, mixer engine and controller 1210, memory 1212, an optional product input device such as a bar code reader controller 1214 having a bar code reader 1216, plurality of buttons 1217 and heating element controller 1218. The heating element controller 1218 is connected to heating element 1220 and controls the cycling of the heating element and heat applied to baking dough. The display 1208 is controlled by a display controller 1222 and converts the messages received from the controller 1202 into human perceptible graphics, such as symbols and letters to form words.

The controller 1202 is preferably a microprocessor. In an alternate embodiment, controller 1202 may be a reduced instruction set chip (RISC) processor, micro-controller, digital circuits functioning as a controller, analog circuits functioning as a controller, a combination of analog and digital circuits functioning as a controller, or a digital signal processor.

The display 1208 may be preferably able to display text and low-resolution graphics. The display is controlled by a display controller 1222 that is in communication with memory 1212 and controller 1202. The display 1208 is a liquid crystal non-color display. In an alternate embodiment, a high-resolution display may be used. Further, a color display may be used in yet another embodiment. Even through a LCD display has been used with the preferred embodiment, any other types of displays that are capable of displaying data may be used, including cathode ray tubes and plasma displays. The display may even be a touch screen that combines the plurality of buttons 1217 with display 1208.

The power line communication unit 1206 is a unit that transmits a carrier signal that is capable of transporting data between devices over the traditional home AC wiring that electrical appliances receive power from. Thus, the power line communication unit 1206 is shown as both a power supply for the breadmaker 118 and a communication unit that enables two-way communication with the intelligent controller 102 that share the AC wiring. Examples of such power line communication approaches include; X-10, CEBUS, and POWERBUS by Domosys Corp. Of course other local network interfaces could alternatively be used.

The local network communication unit 1206 enables two-way communication from an appliance to another device and the exchange of data including recipe programs and time synchronization messages. The two-way communication preferably does not occur over a continuous communication path, rather communication occurs between the appliance and the intelligent controller 102 and then between the intelligent controller 102 and the server 104. Similarly, communication may occur between the server 104 and the intelligent controller 102, and then between the intelligent controller 102 and appliances. In alternate embodiments, a communication may be established between the appliance and the server 104 through the intelligent controller 102.

The memory 1212 is a combination of random access memory (RAM), such as dynamic random access memory (DRAM), synchronous dynamic random access memory (SDRAM), or other types of read/write memory, and of read only memory (ROM), such as programmable read only memory (PROM), electrically erasable programmable read only memory (EEPROM). In an alternate embodiment, the memory may include external semi-permanent memory, such as magnetic disk (hard disk, removable hard disk, floppy disk), optical disk (CD-RW) or external permanent memory (CD-R and DVD-R). The memory is 1212 is divided into a program portion that controls the operation of the breadmaker 118 and a data portion that maintains configuration data and variables used and manipulated by the controller 1202 upon execution of a program.

In manual operation, the user may set select the bread type and crust darkness using the plurality of buttons 1217. The breadmaker may be turned on or off by one of the plurality of buttons 1217. Once turned on, controller 1202 in the breadmaker 118 executes a default breadmaking recipe program in memory 1212 that instructs the mixer engine and controller 1210 heating element controller 1218 to start the bread making process that finishes upon the executed default breadmaking program ending.

The breadmaker may alternatively be configured from the intelligent controller 102 and device 104. The intelligent controller 102 detects the presence of breadmaker 118 when the breadmaker 118 broadcasts a message via the power line communication unit 1206 upon being plugged-in to the outlet 126. In an alternate embodiment, the intelligent controller 102 periodically checks for new appliances, by broadcasting a message to all appliances connected either to the power line network or by periodically searching for specific types of appliances, such as breadmaker 118. In yet another embodiment, registration occurs at a web page displayed on the web device 104 that enables the user to enter information into a user profile 204, such as selecting an input box associated with the breadmaker 118 or a serial number, that is downloaded to the intelligent controller 102. The breadmaker 118 may also provide some indication of network connection.

The registered breadmaker 118 receives bread making recipe programs from the intelligent controller 102 via the local network communication unit. The intelligent controller in turn has obtained the information from the data previously selected via web page 238. Each of the bread making recipe programs contain a set of instructions for the controller 1202 that control the cycles of the breadmaker 118. If no bread making recipe programs are selected, the breadmaker 118 loads default bread making recipe programs from the user profile 204 via the intelligent controller 102. The bread making recipe program from memory 1212 may preferably be selected by scanning a UPC symbol on a pre-mix bread making package using bar code reader 1216. In one preferred embodiment, the bar code reader 1216 is shaped like a pen and activates by pressing button 1219. An audible signal is generated upon the successful scanning of a unique product code, such as a UPC symbol when button 1219 is activated.

The bar code reader controller 1214 receives the read UPC symbol from the bar code reader 1216 and converts the bar code symbol into digital data that is read by the controller 1202 over bus 1204. In other embodiments, other types of input may be used for identifying a unique product code, including punch cards, magnetic encoded information (e.g. magnetic strips), keypad entry or other manual entry. The controller 1202 then identifies if one of the bread making recipe program in memory is associated with the digital data received from the bar code reader controller 1214.

Upon identifying the bread making recipe program, the controller 1202 then starts to execute the selected bread making recipe program. Directions for using the pre-mix bread recipe are displayed on display 1208 via display controller 1222. The controller 1202 executing the bread making recipe program initiates each cycle by instructing the mixer engine and controller 1210 along with heating element controller 1218 as to when to turn on and off, and heating temperature (warm to raise dough 90 degrees, hot 350 degrees to bake, and warm 90 degrees to keep bread warm).

During execution of the bread making recipe program, the breadmaker 118 may count down and display the minutes remaining until the bread is done. In this preferred approach, the controller 1202 sets a counter that is decrements to track passing of time. In an alternate embodiment, a real-time clock 1224 may be in communication with controller 1202. The real-time clock 1224 receives time messages from the information controller 102, periodically. The real-time clock 1224 then synchronizes to the time maintained by the intelligent controller 102. The real-time clock 1224 functions in similar fashion to the real-time clock 1112 in coffeemaker 116.

If a unique product code that was scanned or otherwise entered into the system is not found in memory 1212 by controller 1202, then the display controller 1222 is instructed by the controller 1202 to display "Not in Memory" on display 1208. The user manually selects the bread making recipe program to be used with the pre-mix bread. In an alternate embodiment, a default bread making recipe program is used with the pre-mix bread when the UPC that was scanned is not found in memory 1212. An unknown UPC message is formatted by the controller 1202 containing the unknown UPC a sent via the power line communication unit 1206 to the intelligent controller 102. Upon the next synchronization between the database 202 and the intelligent controller 102, the unknown UPC is sent to the web source 104. If the database 202 has a bread making recipe program associated with the unknown UPC, then the user profile 204 is updated with the bread making recipe program and scheduled for download to the intelligent controller 102 upon next synchronization.

In an alternate embodiment, the receipt of an unknown product code message by the intelligent controller 102 results in an immediate synchronization with the web database 202. If the product code is not be found in the database, then the user profile 204 is updated with the UPC as a continuing request for a predetermined period (i.e. one month with a maximum limit of twenty unique product codes). If the bread making recipe program becomes available during the continuing request predetermined period, then the bread making recipe program sent to the breadmaker 118 via the intelligent controller 102 over the local network.

In another embodiment the end user may be able to specifically program each bread making step via web device 112 and web server 104, saving the results in user profile 204 to be downloaded to the breadmaker as any pre-existing recipe program. FIG. 12A shows an exemplary web page 1250 that provides one potential interface for this programming.

Microwave Oven

Figure 13:
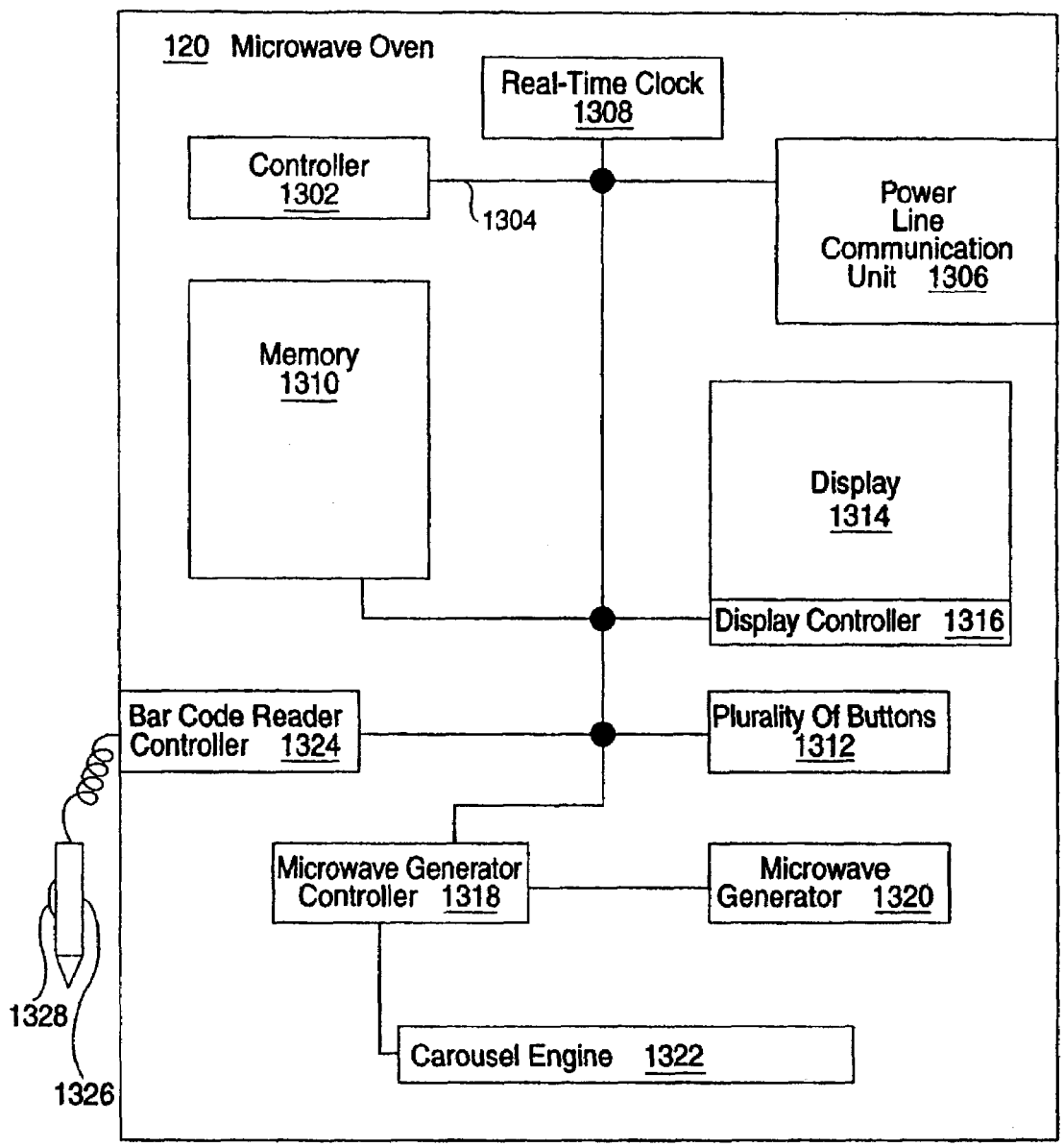
FIG. 13 is a block diagram of the microwave oven with a local network communication link of FIG. 1.

FIG. 13 is a block diagram of the microwave oven 120 with a local network communication unit 1306 of FIG. 1. Local network communication unit 1306 is preferably a power line communication unit. In the microwave oven 120, a controller 1302 is operably connected via a bus 1304 to the power line communication unit 1306, a real-time clock 1308, a memory 1310, a plurality of buttons 1312, a display 1314 via a display controller 1316, a microwave generator controller 1318, and a product code input controller unit, such as a bar code reader controller 1324. Examples of other types of product code inputs include magnetic media, punch cards, and keypads. The microwave generator controller 1318 controls and is coupled to the microwave generator 1320 and a carousel engine 1322.

The controller 1302 is preferably a microprocessor. In an alternate embodiment, controller 1302 may be a reduced instruction set chip (RISC) processor, micro-controller, digital circuits functioning as a controller, analog circuits functioning as a controller, a combination of analog and digital circuits functioning as a controller, or a digital signal processor.

The display 1314 is preferably able to display text and low-resolution graphics. The display is controlled by a display controller 1316 that is in communication with memory 1310 and controller 1302. The display 1314 may be a liquid crystal non-color display. In an alternate embodiment, a high-resolution display may be used. Further, a color display may be used in yet another embodiment. Even through a LCD display has been used with the preferred embodiment, any other types of displays that are capable of displaying data may be used, including cathode ray tubes and plasma displays. The display may even be a touch screen that combines the plurality of buttons 1312 with display 1314.

The power line communication unit 1306 is a unit that transmits a carrier signal that is capable of transporting data between devices over the traditional home AC wiring that electrical appliances receive power from. Thus, the power line communication unit 1306 is shown as both a power supply for the microwave oven 120 and a communication unit that enables two-way communication with the intelligent controller 102 that share the AC wiring. Examples of such power line communication approaches include; X-10, CEBUS, and POWERBUS by Domosys Corp. Of course other local network interfaces could alternatively be used.

The power line communication unit 1306 enables two-way communication from an appliance to another device and the exchange of data including recipe programs and time synchronization messages. The two-way communication preferably does not occur over a continuous communication path, rather communication occurs between the appliance and the intelligent controller 102 and then between the intelligent controller 102 and the server 104. Similarly, communication may occur between the server 104 and the intelligent controller 102, and then between the intelligent controller 102 and appliances. In alternate embodiments, a communication may be established between the appliance and the server 104 through the intelligent controller 102.

The memory 1310 is a combination of random access memory (RAM), such as dynamic random access memory (DRAM), synchronous dynamic random access memory (SDRAM), or other types of read/write memory, and of read only memory (ROM), such as programmable read only memory (PROM), electrically erasable programmable read only memory (EEPROM). In an alternate embodiment, the memory may include external semi-permanent memory, such as magnetic disk (hard disk, removable hard disk, floppy disk), optical disk (CD-RW) or external permanent memory (CD-R and DVD-R). The memory 1310 is divided into a program portion that controls the operation of the microwave oven 120 and a data portion that maintains configuration data and variables used and manipulated by the controller 1302 upon execution of a program.

In manual operation, the user may set time and power level or energy setting of the microwave oven 120 using the plurality of buttons 1312. The microwave oven may be turned on or off by one of the plurality of buttons 1312 and will not start until the cooking chamber containing the carousel is closed. Once turned on, controller 1302 in the microwave oven 120 is activated at the set power level for the time period set by the user. The microwave generator controller 1318 start the oven cooking process that finishes upon the expiration of the time period set by the user. The microwave generator controller activates the microwave generator 1302 that results in high frequency electromagnetic signals that heat items placed in the cooking chamber. The microwave generator controller 1318 also activates the carousel engine 1322 that is connected to a turntable that rotates items in the cooking chamber and results in a more even distribution of the high frequency electromagnetic signals. Similarly, the real-time clock 1308 that generates the time that is displayed in display 1314 may be manually set using the plurality of buttons 1312.

The microwave oven may alternatively be configured from the intelligent controller 102 and device 104. The intelligent controller 102 detects the presence of microwave oven 120 when the microwave oven 120 broadcasts a message via the power line communication unit 1306 upon being plugged-in to the outlet 128. In an alternate embodiment, the intelligent controller 102 periodically checks for new appliances, by broadcasting a message to all appliances connected either to the power line network or by periodically searching for specific types of appliances, such as microwave oven 120. In yet another embodiment, registration occurs at a web page displayed on the web device 104 that enables the user to enter information into a user profile 204, such as selecting an input box associated with the microwave oven 120 or a serial number, that is downloaded to the intelligent controller 102. The microwave oven may also provide some indication of network connection.

The registered microwave oven 120 receives microwave oven recipe programs from the intelligent controller 102 via the local network communication link. The intelligent controller in turn has obtained the information from the data previously selected via web page 242. If no microwave oven recipe programs are selected, the microwave oven 120 is loaded from defaults microwave oven recipe programs from the user profile 204 via the intelligent controller 102. A microwave oven recipe program from memory 1310 may preferably be selected by scanning a unique product code, such as a UPC symbol on a consumer package (i.e. food container or box) using bar code reader 1326. In one preferred embodiment, the bar code reader 1326 is shaped like a pen and activates by pressing button 1328. An audible signal is generated upon the successful scanning of the unique product code, such as a UPC symbol when button 1326 is activated.

The bar code reader controller 1324 receives the read UPC symbol from the bar code reader 1326 and converts the bar code symbol into digital data that is read by the controller 1302 over bus 1304. The controller 1302 then identifies if one of the microwave oven recipe program in memory 1310 is associated with the digital data received from the bar code reader controller 1324. In other embodiments, the other types of input reader controllers may be used that control such things as manual inputs, punch card readers, and magnetic media readers, to name but a few.

Upon identifying the microwave oven recipe program, the controller 1302 then execute the microwave oven recipe program. Directions for preparing the consumer item are displayed on display 1314 via display controller 1316, and the power level and cooking time are programmed. The user may also be prompted for serving sizes and to proceed to other steps. The user may respond by using the plurality of buttons 1312 to the different prompts on display 1314. The controller 1302 also instructs the microwave generator controller 1318 as to when to turn on, off (cook time), and power level that will be used to cook the consumer product that scanned.

During execution of a microwave oven recipe program, the microwave oven 120 may count down the remaining minutes until the consumer product is done. In this preferred approach the controller 1302 sets a counter in the real-time clock 1308 and relays time data to the display controller 1316 that is then shown on display 1314. The real-time clock 1308 receives time messages from the information controller 102, periodically. The real-time clock 1308 then synchronizes to the time maintained by the intelligent controller 102. The real-time clock 1308 functions in similar fashion to the real-time clock 1112 in coffeemaker 116.

If a UPC that was scanned is not found in memory 1310 by controller 1302, then the display controller 1316 is instructed by the controller 1302 to display "Not in Memory" on display 1314. The default microwave oven recipe program is then used with the consumer product. An unknown UPC message is formatted by the controller 1302 containing the unknown UPC a sent via the power line communication unit 1306 to the intelligent controller 102. Upon the next synchronization between the database 202 and the intelligent controller 102, the unknown UPC is sent to the web source 104. If the database 202 contains a microwave oven recipe program associated with the unknown UPC, then the user profile 204 is updated with the microwave oven recipe program and scheduled for download to the intelligent controller 102 upon next synchronization.

In an alternate embodiment, the receipt of an unknown UPC message by the intelligent controller 102 results in an immediate synchronization with the web database 202. If the UPC is not be found in the database, then the user profile 204 is updated with the UPC as a continuing request for a predetermined period (i.e. one month with a maximum limit of 20 UPCs). If the microwave oven recipe program becomes available during the continuing request predetermined period, then the microwave oven recipe program is downloaded to microwave oven 120 via the intelligent controller 102.

Oven

Figure 14:
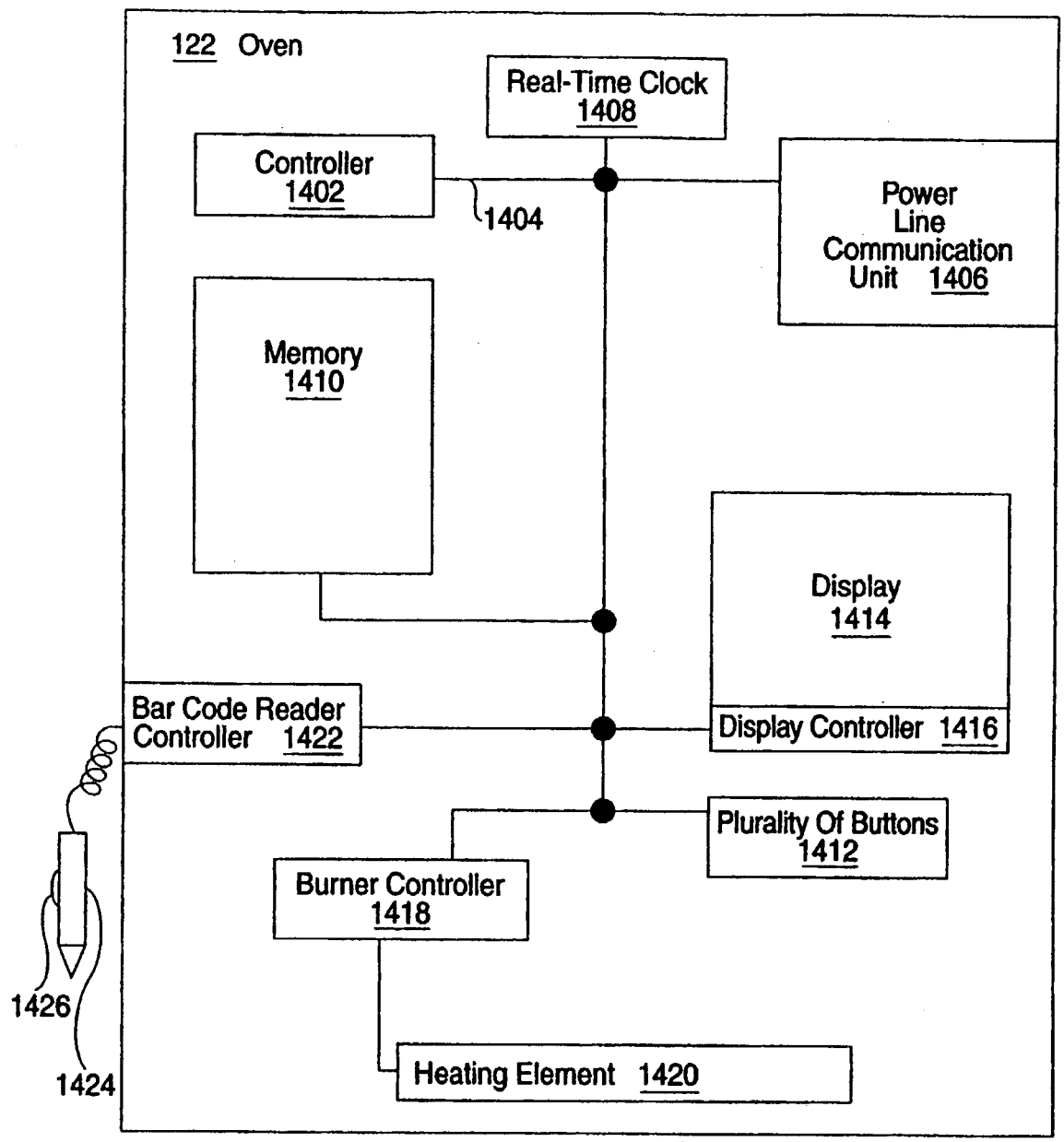
FIG. 14 is a block diagram of the oven with a local network communication link of FIG. 1.

In FIG. 14, a block diagram of the oven 122 with a local network communication unit 1406 of FIG. 1 is shown. Local network communication unit 1406 is preferably a power line communication unit. In the oven 122, a controller 1402 is operably connected via a bus 1404 to the power line communication unit 1406, a real-time clock 1408, a memory 1410, a plurality of controls 1412, a display 1414 via a display controller 1416, a burner controller 1418, and a optional product code input controller, such as a bar code reader controller 1422. Examples of other types of product code input controllers include manual input controllers for accepting entered data, magnetic media reader controllers, punch card reader controllers, to name but a few. The burner controller 1418 the temperature of the oven by controlling the heat generated by a heating element. The term oven is used to describe any type of appliance that cooks in an enclosed cavity with heat generated by non-microwave means and include for example gas ovens, electric ovens, convection ovens, or combinations such as an ultravection oven. The heating element may be an electrical heating element or a fossil fuel type burner. The bar code reader 1422 is connected to a bar code reader 1424 having a button 1426 that activates the bar code reader 1422.

The controller 1402 is preferably a microprocessor. In an alternate embodiment, controller 1202 may be a reduced instruction set chip (RISC) processor, micro-controller, digital circuits functioning as a controller, analog circuits functioning as a controller, a combination of analog and digital circuits functioning as a controller, or a digital signal processor.

The display 1414 is preferably able to display text and low-resolution graphics. The display is controlled by a display controller 1416 that is in communication with memory 1410 and controller 1402. The display 1414 may be a liquid crystal non-color display. In an alternate embodiment, a high-resolution display may be used. Further, a color display may be used in yet another embodiment. Even through a LCD display has been used with the preferred embodiment, any other types of displays that are capable of displaying data may be used, including cathode ray tubes and plasma displays. The display may even be a touch screen that combines the plurality of controls 1412 with display 1414.

The power line communication unit 1406 is a unit that transmits a carrier signal that is capable of transporting data between devices over the traditional home AC wiring that electrical appliances receive power from. Thus, the power line communication unit 1406 is shown as both a power supply for the oven 122 and a communication unit that enables two-way communication with the intelligent controller 102 that share the AC wiring. Examples of such power line communication approaches include; X-10, CEBUS, and POWERBUS by Domosys Corp. Of course, other local network interfaces could alternatively be used.

The power line communication unit 1406 enables two-way communication from an appliance to another device and the exchange of data including recipe programs and time synchronization messages. The two-way communication preferably does not occur over a continuous communication path, rather communication occurs between the appliance and the intelligent controller 102 and then between the intelligent controller 102 and the server 104. Similarly, communication may occur between the server 104 and the intelligent controller 102, and then between the intelligent controller 102 and appliances. In alternate embodiments, a communication may be established between the appliance and the server 104 through the intelligent controller 102.

The memory 1410 is a combination of random access memory (RAM), such as dynamic random access memory (DRAM), synchronous dynamic random access memory (SDRAM), or other types of read/write memory, and of read only memory (ROM), such as programmable read only memory (PROM), electrically erasable programmable read only memory (EEPROM). In an alternate embodiment, the memory may include external semi-permanent memory, such as magnetic disk (hard disk, removable hard disk, floppy disk), optical disk (CD-RW) or external permanent memory (CD-R and DVD-R). The memory is 1410 is divided into a program portion that controls the operation of the oven 122 and a data portion that maintains configuration data and variables used and manipulated by the controller 1402 upon execution of a program.

In manual operation, the user selects an energy setting (temperature) of the oven 122 using the plurality of controls 1412. The user may also be able to set a time period for pre-heating the oven and a cooking time period using the plurality of controls 1412. The oven may be turned on by one of the plurality of controls 1412 that selects the energy setting. Once turned on, controller 1402 in oven 122 executes a default oven recipe program in memory 1410 that instructs the burner controller 1418 to start the heating process by activating the heating element 1420. When the oven finishes execution of the default oven recipe program the controller 1402 instructs the burner controller 1418 to deactivate the heating element 1420 or to keep the oven warm by reducing the heat generated by the heating element 1420. The user may also manually set the real-time clock 1404 so time is properly displayed on display 1414 using the plurality of controls 1412.

The oven may alternatively be configured from the intelligent controller 102 and web device 104. The intelligent controller 102 detects the presence of oven 122 when the oven 122 broadcasts a message via the power line communication unit 1406 upon being plugged-in to the outlet 130. The oven 122 also receives timing messages that enable the controller 1420 to set the real-time clock 1408 and display the correct time on display 1414. In an alternate embodiment the intelligent controller 102 periodically checks for new appliances either by broadcasting a message to all appliances connected to the power line network or by periodically searching for specific types of appliances, such as oven 122. In yet another embodiment, registration occurs at a web page displayed on the web device 104 that enables the user to enter information into a user profile 204, such as selecting an input box associated with the oven 122 or a serial number, that is downloaded to the intelligent controller 102. The oven may also provide some indication of network connection.

The registered oven 122 receives oven recipe programs from the intelligent controller 102 via the local network communication link. The intelligent controller in turn has obtained the information from the data previously selected via web page 236. If no oven recipes are selected, the oven 122 is loaded from defaults oven recipes from the user profile 204 via the intelligent controller 102. The oven recipe program from memory 1410 may preferably be selected by scanning a unique product code, such as a UPC symbol on a consumer package (i.e. food container or box) using bar code reader 1424. In one preferred embodiment, the bar code reader 1424 is shaped like a pen and activates by pressing button 1426. An audible signal is generated upon the successful scanning of a UPC symbol when button 1426 is activated.

The bar code reader controller 1422 receives the read UPC symbol from the bar code reader 1424 and converts the bar code symbol into digital data that is read by the controller 1402 over bus 1404. The controller 1402 then identifies if a oven recipe program that is associated with the digital data received from the bar code reader controller 1422. In alternate embodiments, other types of product code reader controllers may be used, such as manual input controllers, punch card controllers, magnetic media reader controllers, to name but a few.

Upon identifying the microwave oven recipe program, the controller 1402 then starts to execute the oven recipe program. Directions for use of the oven recipe program are displayed on display 1414 via display controller 1416. The user may also be prompted for serving sizes and to proceed in the preparation of the scanned consumer product. The user may respond to such by using the plurality of controls 1412. The controller 1402 also instructs the burner controller 1418 as to when to turn on and off, and what temperature is required to cook the consumer product that was previously scanned.

During execution of a program associated with the selected oven recipe program, the oven 122 may count down and display the remaining minutes until the consumer product is done. The controller 1402 sets a counter in the real-time clock 1408 and relays time data to the display controller 1416 that is then shown on display 1414. The real-time clock 1408 receives time messages from the information controller 102, periodically. The real-time clock 1408 then synchronizes to the time maintained by the intelligent controller 102. The real-time clock 1408 functions in similar fashion to the real-time clock 1112 in coffeemaker 116.

If a UPC that was scanned is not found in memory 1410 by controller 1402, then the display controller 1416 is instructed by the controller 1402 to display "Not in Memory" on display 1414. The default oven recipe program is then used with the consumer product or the user is prompted to manual set the oven 122. An unknown unique product code message is formatted by the controller 1402 containing the unknown unique product code, such as a UPC and sent via the power line communication unit 1406 to the intelligent controller 102. Upon the next synchronization between the database 202 and the intelligent controller 102, the unknown UPC is sent to the web source 104. If the database 202 contains a recipe associated with the unknown UPC, then the user profile 204 is updated with the oven recipe program and scheduled for download to the intelligent controller 102 upon next synchronization. In an alternate embodiment, the receipt of an unknown UPC message by the intelligent controller 102 results in an immediate synchronization with the web database 202. If the UPC is not be found in the database, then the user profile 204 is updated with the UPC as a continuing request for a predetermined period (i.e. one month with a maximum limit of 20 UPCs). If the oven recipe program becomes available during the continuing request predetermined period, then the oven recipe program is downloaded to the oven 122 via the intelligent controller 102.

Flow Chart

Figure 15:
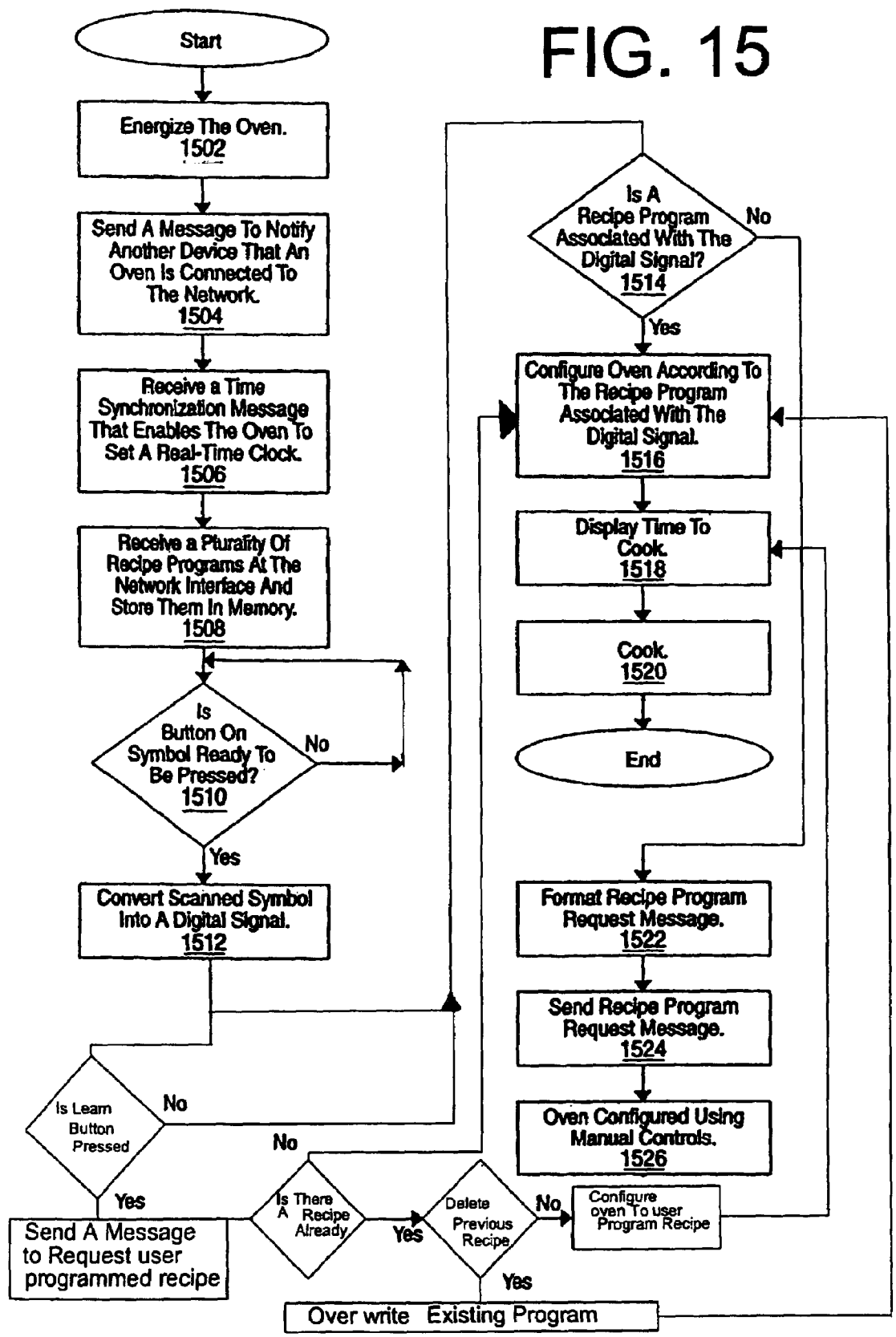
FIG. 15 is a flow chart of an intelligent microwave oven process in accordance with an embodiment of the invention.

Turning to FIG. 15, a flow chart of an intelligent microwave oven process is shown. A microwave oven 120 is a household appliance that is energized (1502) by connecting the microwave oven 120 to the AC wiring of a home at a wall receptacle 128. The microwave oven 120 is configured with a network interface, such as the power line communication unit 1306, that enables bi-direction communication across a home network with other network devices. Upon the microwave oven 120 being energized (1502), an announcement message is formatted by the controller 1302 and transmitted by the power line communication unit across the network for reception by a device such as intelligent controller 102. The announcement message notifies at least one other device in the home network that the microwave oven 120 is present and energized.

The microwave oven 120 may receive a time synchronization message that enables the real-time clock 1308 in the microwave oven 120 to be set to a network time (1506). In an alternate embodiment the microwave oven 120 may set a human perceptible synchronization indicator for a preset time period, such as a light emitting diode (LED), symbol on a display, audio signal, mechanical signal (i.e. a raised flag) being set for a time period of ten days. If another synchronization message is not received during the preset time period, then the human perceptible synchronization indicator is unset. The synchronization message is periodically received at the power line communication unit 1306 either in response to a request triggered by an event (energizing microwave oven, change to or from day light savings time or expiration of a timer) or upon the time synchronization message being broadcast to all network devices 116–122 from a master time keeping device.

The microwave oven 120 receives a plurality of recipe programs at the network interface, i.e. at the power line communication unit 1306, and stores the plurality of recipes in memory 1310 (1508). Each of the recipe programs in the plurality of recipe programs has a digital signal associated with it. A digital signal comprises a string of one or more digital digits that is associated with each of the recipe programs.

The microwave oven 120 may be a symbol input device such as the bar code reader 1326 that is activated by pressing button 1328. If the button 1328 is pressed (1510), then the symbols are read, for example a UPC is scanned by bar code reader 1326. If the button is not pressed (1510), then no symbols are read. Alternatively, the buttons 1312 associated with the microwave oven 120 may be used to input the symbol.

The input symbol is converted into a digital signal (1512) by an input controller, such as the bar code reader controller 1324. If the digital signal is determined by the controller 1302 to be associated with a recipe program stored in memory 1310 (1514), then the controller 1302 configures the microwave oven 120 (i.e. time and power-levels) according the recipe program associated with the digital signal (1516). The controller 1302 executing the recipe program displays on display 1310 the time remaining until the food is cooked (1518). The microwave oven 120 proceeds to cook the food (1520) until the recipe program is complete.

If the digital signal is determined by the controller 1302 to not be associated with a recipe program, then the controller 1302 formats a recipe program request message (1522). The controller 1302 then directs the power line communication unit 1306 to send the recipe program request message (1524). No recipe program is available for the scanned symbol so the microwave oven 120 is manually configured (1526). A recipe program associated with the scanned symbol may be downloaded to the network interface in the microwave oven 120 at a later time for future use (1508).

In an alternate "learn-enabled" embodiment, the microwave oven is also provided with a "recipe input function" which may be actuated by the user to program or teach a user desired recipe program that will be associated with a UPC or other product code. The user programmed recipe program includes one or more cooking time at a selected cooking power entries. Also, the recipe may further include commands prompting the turntable to rotate or stop or have the microwave oven request user intervention at predetermined stages of the recipe. For instance, the microwave oven may be instructed to temporarily shut down the microwave generator and format a message requesting the user to perform one or more physical manipulation steps (e.g. stirring, tossing or flipping the product) prior to resuming cooking. The message may be delivered via a display device on the microwave oven itself or via an operably associate, but external display. An associated audio alarm may also sound to gain the user's attention.

When inputting a recipe program, the user activates the recipe input function (preferably via a dedicated button), enters the UPC or other product code via scanning, key input or the like, and inputs the recipe program via a user interface, e.g. the plurality of buttons 1312. The recipe program is then stored in the oven memory 1310 by the controller 1302. The controller 1302 may also format a message to the intelligent controller 102 via the network interface, wherein the message contains the product code and the user programmed recipe program. The intelligent controller 102 may, in turn, provide the product code and user programmed recipe program to the web server 104. The plurality of user programmed recipe programs associated with a certain product code that have been provided to the web server 104 may be made available to the community of users as the cooking instructions for that particular product. Where the web source 104 already has a recipe program associated with that product code, the user programmed recipe programs may presented as alternatives thereto. Also, the user programmed recipe programs may be statistically analyzed in order to develop a new default recipe based on this analysis.

The microwave oven may be configured to execute either a user programmed recipe program or a recipe program downloaded from web source 104. Upon inputting the UPC or other product code, the controller 1302 instructs the screen controller 1316 to display a message on display 1314 requesting that the user choose between the former recipe program and the latter. Alternatively, said request may be displayed via an external display, e.g. display 218 of intelligent controller 102. The controller 1302 then deletes the recipe program not chosen by the user.

In this "learn-enabled" embodiment, the following method may be achieved. The registered microwave oven 120 receives and memorizes microwave oven recipe programs that will be associated with a UPC or other product code from the intelligent controller 102 via the local network communication link. The intelligent controller in turn has obtained the information from the data previously selected via web page 242 from web source 104. If no microwave oven recipe programs are selected, the microwave oven 120 is loaded from defaults microwave oven recipe programs from the user profile 204 via the intelligent controller 102.

In addition, the user may input user desired recipe program that will be associated with a UPC or other product code. The user recipe program may include one or more parameters like cooking time and power. Also, the recipe may include commands prompting the microwave oven to request user intervention at predetermined stages of the recipe. For instance, the recipe program may instruct the microwave oven to temporarily shut down the microwave generator and format a message requesting the user to perform one or more physical manipulation steps, prior to resuming cooking. The message may be delivered via a display device that is part of the microwave oven, or external but operably associated thereto.

If a recipe program associated with the same product code is present in memory 1310 prior to the programming of the user programmed recipe program, the controller 1302 may pre-display the pre-existing time, power and other entries of said pre-existing recipe program. The user may then input the user programmed recipe program by incremental changes of the preexistent recipe program. The programming is thus facilitated and the search for the optimal recipe program is expedited.

When the user inputs a product code via a scanner, a keyboard or other input means, the microwave oven executes the memorized recipe program associated with the product code. If a user programmed and a web-downloaded recipe programs are both associated with the product code, the controller 1302 formats a message through the display device requesting the user to choose between the two programs. The other recipe program is then deleted, and the chosen one is executed.

If there is no recipe program in the memory associated with the product code, the microwave oven places a message via the intelligent controller 102 to web source 104 requesting a recipe program corresponding to the product code. Moreover, the microwave oven also formats a message through the display device requesting the user to input the user desired recipe program, if so desired.

The following outcomes are thus possible. A recipe program is downloaded from the web source 104, whereas the user opts not to input a user desired program. The controller 1302 then memorizes and executes the downloaded recipe program. Alternatively, because of the unavailability of a recipe program on the web source, only a user programmed recipe program may be used. If both types of recipe programs are available, the controller formats a message through the display device asking the user to choose which of the two to memorize and execute, whereas the other will be deleted.

Should the user elect not to execute either of the two available recipe programs, but keep both undeleted, a temporary recipe program that is executed only on one occasion and that is not stored in memory 1310 may be entered by the user.

The user can overwrite a recipe program with another at any desired time. For instance, when a user can replace a web-downloaded recipe program with a user programmed one. In addition, the controller 1302 may format a message to the intelligent controller 102 containing the user programmed recipe program and the product number. The intelligent controller 102 in turn uploads said recipe program to web server 104. The uploaded recipe may be made part of a set of alternative recipes available to the user community. Also, the plurality of user programmed program recipes pertaining to a particular product may be used in statistical studies aimed at determining the recipe programs most popular with the community of users.

Of course, this flow chart also reflects the recipe and learning interaction that may be used in conjunction with the breadmaker and oven of the present system, as well.

It is appreciated by those skilled in the art that the process as described herein may selectively be implemented in hardware, software, or a combination of hardware and software. An embodiment of the process steps employs at least one machine-readable signal bearing medium. Examples of machine-readable signal bearing mediums include computer-readable mediums such as a magnetic storage medium (i.e. floppy disks, or optical storage such as compact disk (CD) or digital video disk (DVD)), a biological storage medium, or an atomic storage medium, a discrete logic circuit(s) having logic gates for implementing logic functions upon data signals, an application specific integrated circuit having appropriate logic gates, a programmable gate array(s) (PGA), a field programmable gate array (FPGA), a random access memory device (RAM), read only memory device (ROM), electronic programmable random access memory (EPROM), or equivalent. Note that the computer-readable medium could even be paper or another suitable medium, upon which the computer instruction is printed, as the program can be electronically captured, via for instance optical scanning of the paper or other medium, then compiled, interpreted or otherwise processed in a suitable manner if necessary, and then stored in a computer memory.

Additionally, machine-readable signal bearing medium includes computer-readable signal bearing mediums. Computer-readable signal bearing mediums have a modulated carrier signal transmitted over one or more wire based, wireless or fiber optic networks or within a system. For example, one or more wire based, wireless or fiber optic network, such as the telephone network, a local area network, the Internet, or a wireless network having a component of a computer-readable signal residing or passing through the network. The computer readable signal is a representation of one or more machine instructions written in or implemented with any number of programming languages.

Furthermore, the multiple process steps implemented with a programming language, which comprises an ordered listing of executable instructions for implementing logical functions, can be embodied in any machine-readable signal bearing medium for use by or in connection with an instruction execution system, apparatus, or device, such as a computer-based system, controller-containing system having a processor, microprocessor, digital signal processor, discrete logic circuit functioning as a controller, or other system that can fetch the instructions from the instruction execution system, apparatus, or device and execute the instructions.

While various embodiments of the application have been described, it will be apparent to those of ordinary skill in the art that many more embodiments and implementations are possible that are within the scope of this invention. Accordingly, the invention is not to be restricted except in light of the attached claims and their equivalent

What is claimed is:

1. A microwave oven apparatus, comprising:
a housing;
a microwave generator disposed in association with the housing;
a code input device;
a controller that stores a plurality of recipe programs upon receipt of the plurality of programs at the network interface or the user interface and operates the microwave generator in accordance with a recipe program selected from the plurality of recipe programs in view of a code input by the code input device;
a network interface in communication with the controller; and
a user interface to permit a user to manually input a user programmed recipe programs;
wherein upon entry of a code input by the code input device, the controller determines whether the code corresponds to any one of the plurality of recipe programs stored in the controller; and
wherein if the code does not correspond to any one of the plurality of recipe programs stored in the controller, the network interface requests, without user intervention, a recipe program corresponding to the code from an external database, and automatically downloads the recipe program that corresponds to the code.

2. The microwave oven apparatus of claim 1, further comprising:
a clock in communication with the controller, the clock being set upon receipt of a time synchronization message at the network interface.

3. The microwave oven apparatus of claim 1, wherein a recipe program request message is formatted upon the controller failing to associate the input code from the code input device with one recipe program from the plurality of recipe programs.

4. The microwave oven apparatus of claim 3, wherein the network interface is in receipt of a new recipe program associated with the input code in response to the recipe program request message being sent to the external database.

5. The microwave oven apparatus of claim 1, wherein the network interface is in receipt of a user programmed recipe program request message being sent from the external database.

6. The microwave oven apparatus of claim 5, wherein a response to the user programmed recipe program request message is formatted.

7. A method, comprising:
receiving in a microwave oven a plurality of recipe programs at a network interface from an external database;
manually inputting user programmed recipe programs via a user interface;
storing at least one of the plurality of recipe programs and the user programmed recipe programs in a memory by a controller that are each selectable with a digital signal from a code input device;
determining whether a code input by a code input device corresponds to any one of the plurality of recipe programs stored in the memory;
requesting, without user intervention, a recipe program from the operably connected, but external device, if the code input by a code input device does not correspond to any one of the plurality of recipe programs stored in the memory;
automatically downloading the recipe program that corresponds to the code; and
configuring the microwave oven in response to the digital signal being associated with one recipe program in the plurality of recipe programs or the user programmed recipe programs.

8. The method of claim 7, further comprising:
formatting a recipe program request message in response to the controller failing to select a recipe program from the plurality of recipe programs that is associated with the digital signal; and
receiving a requested recipe program at the network interface from the external database in response to the recipe program request message.

9. The method of claim 7, further comprising:
receiving a time synchronization message at the network interface; and
setting a clock in the microwave oven by the controller upon receipt of the time synchronization message.

10. A apparatus, comprising:
means for receiving in a microwave oven a plurality of recipe programs at a network interface from an external database;
means for manually inputting user programmed recipe programs via a user interface;
means for storing at least one of the plurality of recipe programs and the user programmed recipe programs in a memory by a controller that are each selectable with a digital signal from a code input device;
means for determining whether a code input by a code input device corresponds to any one of the plurality of recipe programs stored in the memory;
means for requesting, without user intervention, a recipe program from the operably connected, but external device, if the code input by a code input device does not correspond to any one of the plurality of recipe programs stored in the memory;
means for automatically downloading the recipe program that corresponds to the code; and
means for configuring the microwave oven in response to the digital signal being associated with one recipe program in the plurality of recipe programs or the user programmed recipe programs.

11. The apparatus of claim 10, further comprising:
means for formatting a recipe program request message in response to the controller failing to select a recipe program from the plurality of recipe programs that is associated with the digital signal; and
means for receiving a requested recipe program at the network interface from the external database in response to the recipe program request message.

12. The apparatus of claim 10, further comprising:
means for receiving a time synchronization message at the network interface; and
means for setting a clock in the microwave oven by the controller upon receipt of the time synchronization message.

13. The apparatus of claim 10, further comprising:
means for receiving a request for a user programmed recipe program at the network interface.

14. A machine-readable signal-bearing medium containing instructions that cause a system to perform a method for operating a microwave oven, the method comprising:
receiving in a microwave oven a plurality of recipe programs at a network interface from an external database;
manually inputting user programmed recipe programs via a user interface;
storing at least one of the plurality of recipe programs and the user programmed recipe programs in a memory by a controller that are each selectable with a digital signal from a code input device;
determining whether a code input by a code input device corresponds to any one of the plurality of recipe programs stored in the memory;
requesting, without user intervention, a recipe program from the operably connected, but external device, if the code input by a code input device does not correspond to any one of the plurality of recipe programs stored in the memory;
automatically downloading the recipe program that corresponds to the code; and
configuring the microwave oven in response to the digital signal being associated with one recipe program in the plurality of recipe programs or the user programmed recipe programs.

15. The machine-readable signal-bearing medium of claim 14, further comprising:
formatting a recipe program request message in response to the controller failing to select a recipe program from the plurality of recipe programs that is associated with the digital signal; and
receiving a requested recipe program at the network interface from the external database in response to the recipe program request message.

16. The machine-readable signal-bearing medium of claim 15, further comprising:
receiving a time synchronization message at the network interface; and
setting a clock in the microwave oven by the controller upon receipt of the time synchronization message.

17. The microwave oven apparatus of claim 1 wherein the input interface is further configured to permit the user programmed recipe program to be manually associated with a code capable of being input by the code input device.

* * * * *